United States Patent
McCann et al.

(10) Patent No.: US 8,484,616 B1
(45) Date of Patent: Jul. 9, 2013

(54) UNIVERSAL MODULE MODEL

(75) Inventors: Peter J. McCann, Mason, NH (US);
Christopher M. Gould, Leominster, MA (US)

(73) Assignee: EMC Corporation, Hopkinton, MA (US)

( * ) Notice: Subject to any disclaimer, the term of this patent is extended or adjusted under 35 U.S.C. 154(b) by 838 days.

(21) Appl. No.: 12/456,835

(22) Filed: Jun. 23, 2009

(51) Int. Cl.
*G06F 9/44* (2006.01)

(52) U.S. Cl.
USPC .......................... 717/120; 717/106; 717/107

(58) Field of Classification Search
USPC .................................. 717/120–123, 106, 107
See application file for complete search history.

(56) References Cited

U.S. PATENT DOCUMENTS

| | | | | |
|---|---|---|---|---|
| 5,465,258 | A * | 11/1995 | Adams ......................... | 717/128 |
| 5,715,459 | A * | 2/1998 | Celi et al. ..................... | 719/323 |
| 5,745,761 | A * | 4/1998 | Celi et al. ..................... | 719/323 |
| 5,778,226 | A * | 7/1998 | Adams et al. ................. | 719/311 |
| 5,794,035 | A * | 8/1998 | Golub et al. .................. | 718/104 |
| 5,794,052 | A * | 8/1998 | Harding ........................ | 717/178 |
| 5,815,707 | A * | 9/1998 | Krause et al. ................. | 719/321 |
| 5,826,090 | A * | 10/1998 | Mealey et al. ................ | 717/162 |
| 5,872,956 | A * | 2/1999 | Beal et al. .................... | 709/224 |
| 6,134,601 | A * | 10/2000 | Spilo et al. ................... | 719/328 |
| 6,618,767 | B1 * | 9/2003 | Slaughter et al. ............ | 719/321 |
| 6,622,300 | B1 * | 9/2003 | Krishnaswamy et al. .... | 717/130 |
| 6,636,955 | B1 * | 10/2003 | Kessler et al. ................ | 711/167 |
| 7,096,473 | B2 * | 8/2006 | Ruget et al. .................. | 719/321 |
| 7,127,526 | B1 * | 10/2006 | Duncan et al. ................ | 709/249 |
| 7,178,151 | B2 * | 2/2007 | Ecob et al. .................... | 719/327 |
| 7,275,098 | B1 * | 9/2007 | Becher et al. ................. | 709/223 |
| 7,360,211 | B2 * | 4/2008 | Hyden et al. .................. | 717/174 |
| 7,401,054 | B1 * | 7/2008 | Shah et al. .................... | 705/51 |
| 7,415,710 | B1 * | 8/2008 | Yan et al. ...................... | 718/105 |
| 7,574,713 | B2 * | 8/2009 | Tabares et al. ................ | 719/321 |
| 7,860,890 | B2 * | 12/2010 | Riemann et al. ............. | 707/790 |
| 7,904,878 | B2 * | 3/2011 | Kolathur et al. ............. | 717/106 |
| 7,950,022 | B1 * | 5/2011 | Gould et al. .................. | 719/327 |
| 7,950,025 | B1 * | 5/2011 | McCann et al. .............. | 719/328 |
| 8,042,122 | B2 * | 10/2011 | Mysore et al. ............... | 719/328 |
| 2002/0023211 | A1 * | 2/2002 | Roth et al. .................... | 713/164 |

(Continued)

OTHER PUBLICATIONS

Joseph Kong, Designing BSD Rootkits, Apr. 9, 2007, No Starch Press
Lemon et al., An Object Oriented Device Driver Model, 1995, Taligent Inc. Hewlett-Packard Development Company, Creating and Configuring File System Loadable Modules, 2003 Salzman et al., The Linux Kernel Module Programming Guide, May 18, 2007.*

(Continued)

*Primary Examiner* — Phillip H Nguyen

(74) *Attorney, Agent, or Firm* — Muirhead and Saturnelli, LLC

(57) ABSTRACT

Described are techniques for processing a module. A module is generated for execution on a target operating system. The module includes four entry points and code portions associated with each of said four entry points. The four entry points correspond to four handlers invoked at different processing points in connection with a state associated with said module. The four handlers include a load handler, an unload handler, a start handler, and a quiesce handler. First processing is performed in connection with the module. The first processing including at least one of dynamically loading the module, dynamically unloading the module, starting module-specific processing performed by the module, and issuing a request to commence preparation for unloading the module. An appropriate one or more of the four handlers are invoked in accordance with the first processing performed.

19 Claims, 19 Drawing Sheets

U.S. PATENT DOCUMENTS

| | | | |
|---|---|---|---|
| 2002/0069399 A1* | 6/2002 | Miloushey et al. | 717/108 |
| 2002/0144048 A1* | 10/2002 | Bolt | 711/4 |
| 2003/0014521 A1* | 1/2003 | Elson et al. | 709/225 |
| 2004/0015540 A1* | 1/2004 | Solano et al. | 709/203 |
| 2004/0031014 A1* | 2/2004 | Baecker et al. | 717/104 |
| 2004/0054894 A1* | 3/2004 | Lambert | 713/165 |
| 2004/0093359 A1* | 5/2004 | Sharpe et al. | 707/201 |
| 2004/0103337 A1* | 5/2004 | Smith | 714/2 |
| 2005/0039193 A1* | 2/2005 | Choi et al. | 719/321 |
| 2005/0071856 A1* | 3/2005 | Kumar et al. | 719/330 |
| 2005/0081220 A1* | 4/2005 | Yodaiken et al. | 719/331 |
| 2005/0246656 A1* | 11/2005 | Vasilev et al. | 715/805 |
| 2005/0267856 A1* | 12/2005 | Woollen | 707/1 |
| 2005/0289508 A1* | 12/2005 | Illowsky et al. | 717/106 |
| 2005/0289510 A1* | 12/2005 | Illowsky et al. | 717/107 |
| 2006/0033945 A1* | 2/2006 | McDonald et al. | 358/1.13 |
| 2006/0041878 A1* | 2/2006 | Albot et al. | 717/162 |
| 2006/0070089 A1* | 3/2006 | Shoaib et al. | 719/321 |
| 2006/0253859 A1* | 11/2006 | Dai et al. | 719/321 |
| 2007/0294704 A1* | 12/2007 | Stephen et al. | 719/315 |
| 2008/0134157 A1* | 6/2008 | Liao | 717/140 |
| 2008/0147745 A1* | 6/2008 | Wilkinson et al. | 707/200 |
| 2008/0178174 A1* | 7/2008 | Woolen | 717/177 |
| 2009/0064196 A1* | 3/2009 | Richardson et al. | 719/327 |
| 2009/0153540 A1* | 6/2009 | Blinzer et al. | 345/212 |
| 2009/0292825 A1* | 11/2009 | Rosu et al. | 709/250 |
| 2010/0242031 A1* | 9/2010 | Yodaiken et al. | 717/163 |
| 2011/0131558 A1* | 6/2011 | Young et al. | 717/145 |
| 2011/0264854 A1* | 10/2011 | Ouchi | 711/114 |

OTHER PUBLICATIONS

Hewlett-Packard Development Company, Managing and Developing Dynamically Loadable Kernel Modules, Jun. 7, 2001 Katayama et al., Prototype of the Device Driver Generation System for UNIX-like Operating Systems, 2000 Hewlett-Packard Development Comapny, Writing a DLKM Driver.*

U.S. Appl. No. 12/215,917, filed, Jun. 30, 2008. McCann et al.

U.S. Appl. No. 12/079,759, filed Mar. 28, 2008. McCann et al.

U.S. Appl. No. 12/079,822 (the '822 application), filed Mar. 28, 2008. McCann et al.

U.S. Appl. No. 12/286,433, filed Sep. 29, 2008. Gould et al.

\* cited by examiner

Container Module DB API code in U space 1310

1302 physical load
1303  – call OS routine to physically load module
1306  – call OS routine to obtain module defined entry points for start, quiesce, load and unload handlers.
1308  – register module (initialize entry in table, set module state and handler addresses for entry)
1304 logical load
1310  – call module load handler 1322 logical unload
 – unregister module (remove module information from table)
 – call module unload handler.

1320 physical unload – call OS routine to physically unload module

FIGURE 15

CLI_unload_all:
1402 - obtain list of all modules for all containers
1404  unload count=0; quiesce count = 0;
1406 - try again:: for each module:
1408 {
1410       - call CLI_quiesce module
1412       - if quiesce was successful then
              {
1414          quiesce count ++;
1418          call CLI_unload module
1420          if unload successful then
1422              unload count ++;
              }
1426       else track module as failing for this iteration
1427 } /* end try again loop processing */
1428 if all modules unloaded then STOP
1430 - if Progress then   /* if quiesce count or unload count increases */
1434    - Go to try again.
1436 else
        {
1440    - Select U space container and kill container
1442    - go to try again
        }

FIGURE 16

UNIVERSAL MODULE MODEL

BACKGROUND

1. Technical Field

This application generally relates to computer systems, and more particularly to techniques related to code modules.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A data storage system environment may consist of a wide variety of different hardware and software. For example, a data storage system may use a variety of different operating systems, hardware platforms, file systems, and the like. Problems may arise in connection with development of new code modules as well as for existing code modules intended for execution on data storage systems in order for the code modules to be usable in the different environments.

Thus, it may be desirable to utilize a flexible architecture and framework which allows a same code module to be used in the variety of different data storage system and other environments.

SUMMARY OF THE INVENTION

In accordance with one aspect of the invention is a computer implemented method for processing a module comprising: generating a module for execution on a target operating system, said module including four entry points and code portions associated with each of said four entry points, said four entry points corresponding to four handlers invoked at different processing points in connection with a state associated with said module, said four handlers including a load handler invoked in connection with dynamically loading said module, an unload handler invoked in connection with dynamically unloading said module, a start handler invoked in connection with starting module-specific processing performed by said module, and a quiesce handler invoked in connection with a request to commence preparation for unloading the module; performing first processing in connection with the module, said first processing including at least one of dynamically loading the module, dynamically unloading the module, starting module-specific processing performed by the module, and issuing a request to commence preparation for unloading the module; and invoking an appropriate one or more of the four handlers in accordance with the first processing performed. The module may be an operating system specific module and the method may further include dynamically loading said operating system specific module into an address space of a container; and invoking said load handler. The method may also include determining a state associated with the module at a point in time in connection with whether the module at the point in time is loaded, unloaded, quiesced, or started. The quiesce handler may be invoked in connection with a request to have the module stop providing a service or performing work. The module may be an operating system specific module and said generating the module may further comprise analyzing a first code module to generate an operating system specific skeleton in accordance with the target operating system, and generating the operating system specific module which includes code for the operating system specific skeleton and code for the first code module. The operating system specific module may be dynamically loaded into an address space of a target container, said target container may include code for managing a container module database of modules and associated module information of modules included in the target container. The operating system specific skeleton may include an operating system dependent portion and an operating system independent portion where the operating system dependent portion vary in accordance with whether the target container is a user space container or a kernel space container. In connection with dynamically loading and unloading the operating system specific module into the address space of the target container and the target container is a kernel space container, the target operating system may transfer control to the operating system dependent portion, code of the operating system specific dependent portion may transfer control to the operating system independent portion, and code of the operating system independent portion may transfer control to the code for managing the container module database to register addresses of the four handlers. The code for managing a container module database of modules may perform processing including maintaining a module table of module information for each module of said target container, said module information including a state of said each module, resource information for said each module, and addresses of handler entry points for said each module, said handler entry points being addresses of the four handlers. The code for managing the container module database may perform processing to enforce valid state transitions in accordance with a state model and state information included in the module table. The resource information for a module may include an indication as to whether resources are currently allocated and in use by the module. Processing for dynamically loading the module may include a first portion for physically loading the module into the address space of a target container and a second portion for performing logical load processing, said logical load processing including invoking the load handler. Processing for dynamically unloading the module may include a first portion for physically unloading the module into the address space of a target container and a second portion for performing logical unload processing, said logical unload processing including invoking the unload handler. The module may be dynamically loaded into an address space of a kernel space container, and the method may include transferring control to a helper module executing in user space, said helper module executing an operating system native call to dynamically load the module into the kernel space container. The kernel space container may include first code which maintains module information about modules of the kernel space container. The first code may be invoked by the operating system as a result of executing said operating system native call to dynamically load the module. The first code may update module information to include addresses of the four handlers.

In accordance with another aspect of the invention is a computer readable medium comprising executable code stored thereon for processing a module, the computer readable medium comprising executable code stored thereon for: generating a module for execution on a target operating system, said module including four entry points and code portions associated with each of said four entry points, said four entry points corresponding to four handlers invoked at different processing points in connection with a state associated with said module, said four handlers including a load handler invoked in connection with dynamically loading said module, an unload handler invoked in connection with dynamically unloading said module, a start handler invoked in connection with starting module-specific processing performed by said module, and a quiesce handler invoked in connection with a request to commence preparation for unloading the module; performing first processing in connection with the module, said first processing including at least one of dynamically loading the module, dynamically unloading the module, starting module-specific processing performed by the module, and issuing a request to commence preparation for unloading the module; and invoking an appropriate one or more of the four handlers in accordance with the first processing performed. The module may be an operating system specific module and the computer readable medium may further comprise executable code for: dynamically loading said operating system specific module into an address space of a container; and invoking said load handler. The computer readable medium may also include executable code for determining a state associated with the module at a point in time in connection with whether the module at the point in time is loaded, unloaded, quiesced, or started. The quiesce handler may be invoked in connection with a request to have the module stop providing a service or performing work. The module may be an operating system specific module and the executable code for generating the module further may comprise executable code for: analyzing a first code module to generate an operating system specific skeleton in accordance with the target operating system; and generating the operating system specific module which includes code for the operating system specific skeleton and code for the first code module, wherein said operating system specific module is dynamically loaded into an address space of a target container, said target container including code for managing a container module database of modules and associated module information of modules included in the target container, wherein said module is a binary and the first code module is a source code module.

BRIEF DESCRIPTION OF THE DRAWINGS

Features and advantages of the present invention will become more apparent from the following detailed description of exemplary embodiments thereof taken in conjunction with the accompanying drawings in which:

FIG. 15 is an example illustrating logical processing that may be performed in an embodiment in connection with a module which is loaded/unloaded into a user space container;

FIG. 16 is an example of processing that may be performed in an embodiment in connection with use of the quiesce processing described herein.

DETAILED DESCRIPTION OF EMBODIMENT(S)

Figure 1:
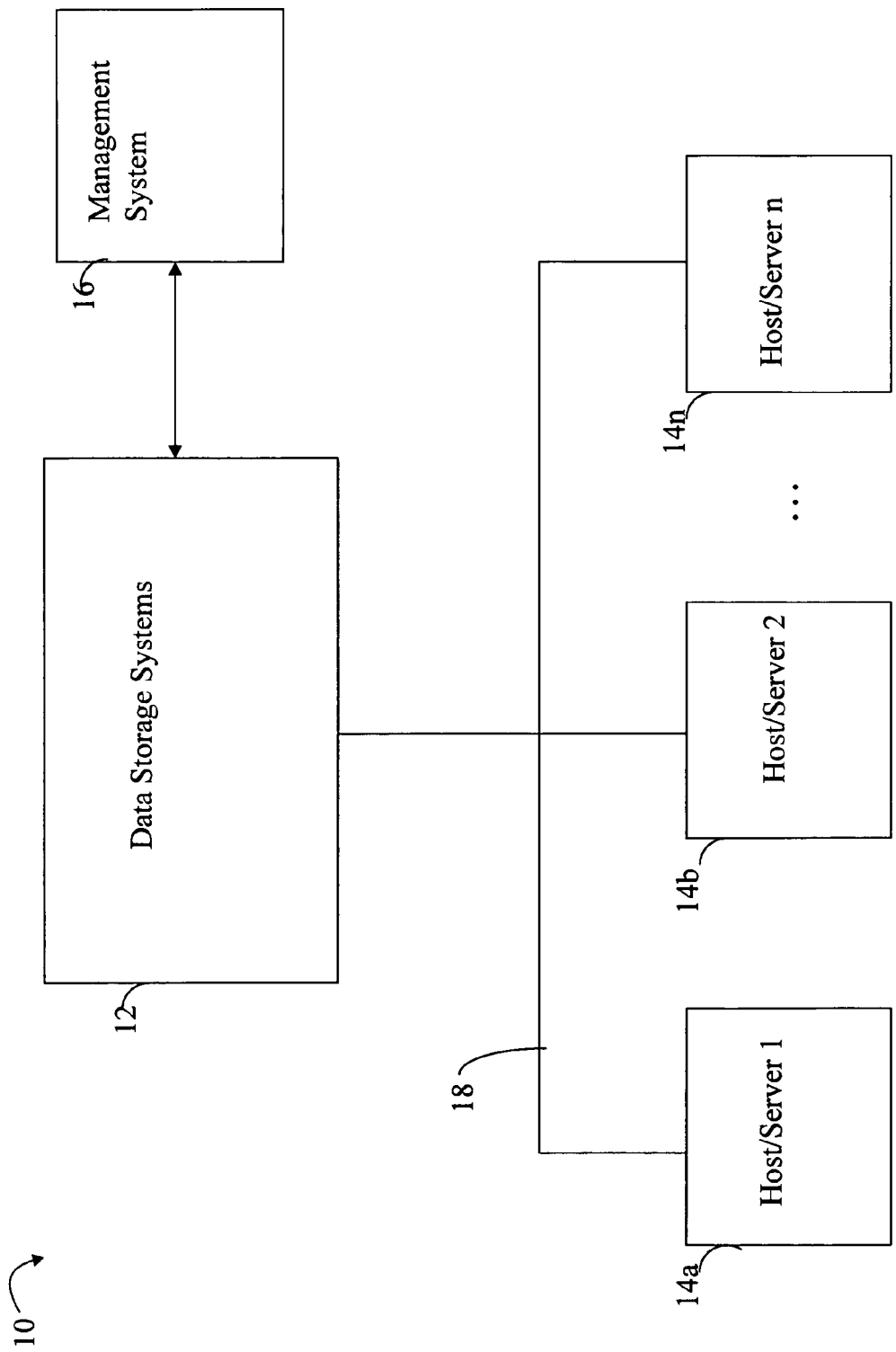
FIG. 1 is an example of an embodiment of a computer system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14*a*-14*n* through communication medium 18. The system 10 also includes a management system 16 connected to one or more data storage systems 12 through communication medium 20. In this embodiment of the computer system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices, such as disks, flash memory drives, and the like. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk or other types of drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interface) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
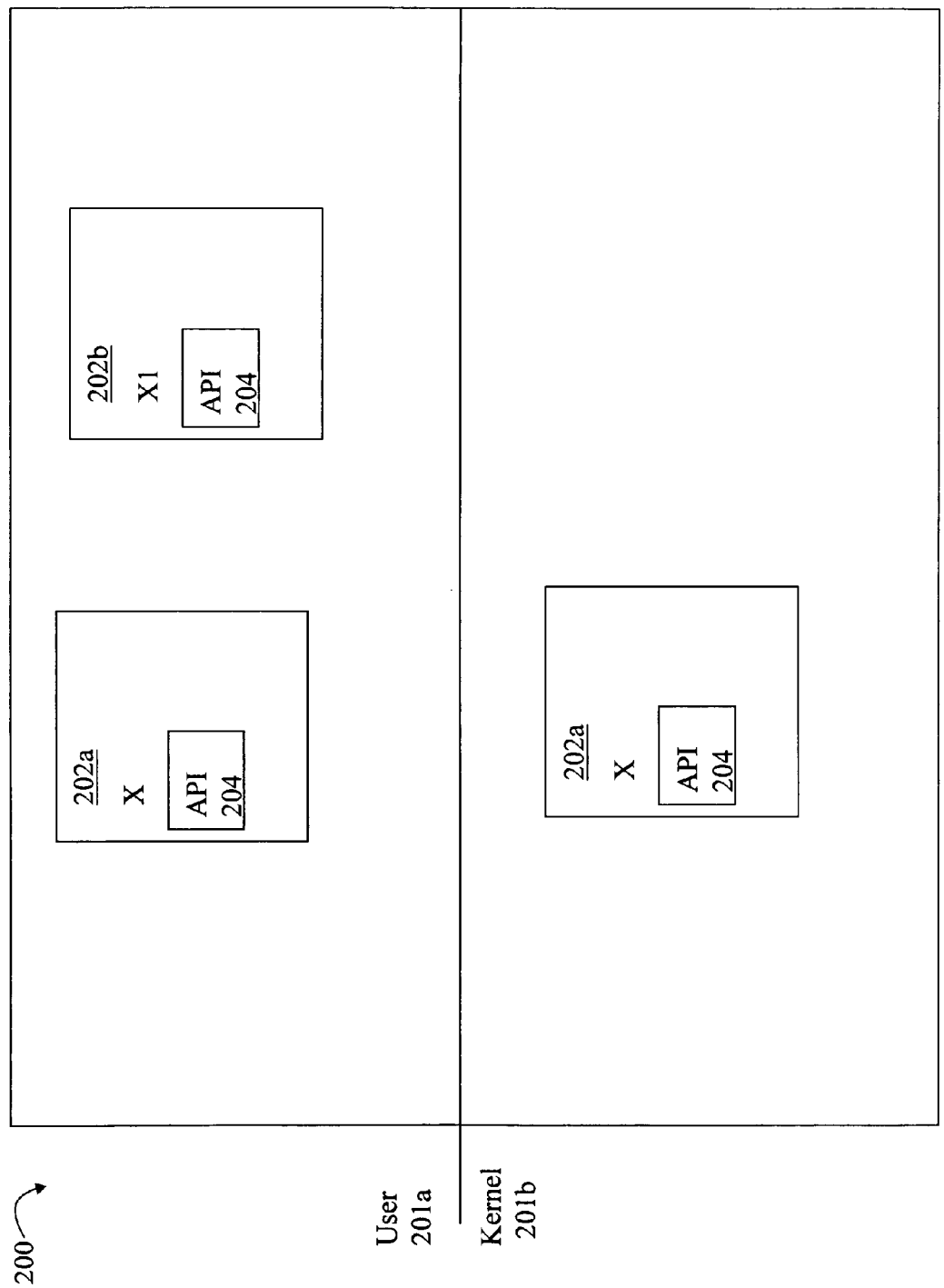
FIG. 2 is an example illustrating use of an API (application programming interface) in connection with a same code module that may be executed in user space and kernel space in an embodiment in accordance with the techniques herein.

Referring to FIG. 2, shown is an example of components that may be executing on a processor node of a data storage system. If a data storage system has multiple processors, FIG. 2 illustrates components that may be executed by each such processor. In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, each of elements 202a and 202b included in user space 201a may be a code module executing in user space, such as a user space process or container. Each of 202a and 202b executing in user space may utilize an API 204 to perform different operations. Each of 202a and 202b in user space may be a user space process or container having its own process address space. Each user space process or container may have its own process address space. Thus, each user space process may be characterized as a single container or fault domain for fault containment purposes. In other words, each user process has its own state and can have an execution fault independent of, or isolated from, other containers or fault domains as may be associated with other user space processes as well as from code executing in the kernel space described below. Therefore, when one of the user space processes experiences a fault or otherwise terminates, the other code executing in other containers (such as other user space processes) may continue to execute without being affected by the fault. When a first of the executing processes, as may be executing in user space or kernel space is notified of the failing process (as may be executing in user space), the first process may also notify other executing user and/or kernel space modules. The first process, or other currently executing user space process or kernel space code, may perform processing on behalf of the failing process and may perform cleanup associated with the failing process. In one embodiment, each user process can save information about its own state in an area of memory external to the process so that another process can perform cleanup, resume processing of the failed process, and the like. Additionally, code executing in user space or kernel space process may take steps in response to the failing process in accordance with any outstanding requests or processing being performed by the failing process. For example, a first process may reissue its request previously made to a failing user process to another user process instance performing the same services or functionality as the failing process. In contrast to user space containers, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each separate fault domain, container and associated address space for each instance of 202a and 202b executing in user mode 201a.

As illustrated, the same code module represented by element 202a may also be executed in kernel space. As will be described in following paragraphs using the common software environment herein, a code module 202a may use API 204 which implements user and kernel mode variations of necessary operations allowing the same code module 202a to execute in both user and kernel mode without modification to the original source code. In other words, for a given API call, any coding difference in implementing the API call when executing in user or kernel mode, different operating system, or other data storage system environment particular, may be embedded in the code of the API.

In the example 200, the same code module 202a may execute in both user space and kernel space and use the same API 204. The underlying details implementing the functionality of the API call are embedded in the API code and not the code associated with 202a. Using the API 204, an embodiment may make a same set of functionality available to code that executes in both user and kernel space and leave the implementation details of the API calls to be included in the API code. The API may provide services to kernel space code which are implemented using, and may be otherwise only available to, code executing in user space. Similarly, the API may provide services to user space code which are implemented using, and may be otherwise only available to, code executing in kernel space. For example, a device driver or other code module typically executed in kernel mode may alternatively be executed in user mode with the ability to have multiple instances and allow a first instance of a driver to assist in recovery on failure of another device driver instance. As another example, during development of code that will execute in kernel mode, the code modules may be developed and executed in the user mode to facilitate debugging. At a later point once debugging is complete, the code may be executed in kernel mode unmodified.

As described above, the common software environment may include the API and other code modules to implement the framework providing the user-kernel portability as well as portability among different hardware and software platforms (e.g., different operating systems, data storage systems and underlying hardware, and the like). The common software environment may include other code provided as a layer between the API and operating system specific code, for example, to facilitate communications with devices.

As described above, the same API may be used by a code module when the code module is executed in user space, kernel space, and/or on different data storage systems having different environments such as different operating system and/or processor architecture. The code module may make API calls so that the API implements the same set of API calls to facilitate portability of the code module for execution in user space or kernel space or on any one of a variety of different software environments that may be supported in accordance with the functionality included in the API. Thus, a module coded using the API as described herein may be executed in user mode or kernel mode unmodified. Furthermore, the same module may be executed on different data storage systems having different data storage system environments provided the particular data storage system environment is supported by the API. Thus, processing dependencies that may vary with user or kernel mode as well as operating system and underlying processor architecture may be handled by the API code so that a module utilizing the API as described herein may be executed in a variety of different data storage system environments as well as user or kernel mode.

It should be noted that although the example 200 of FIG. 2 illustrates a single code module 202a included in a first U-space (user space) container, a single code module 202b included in a second U-space container and a single code module 202a included in a K-space (kernel space) container, each of the foregoing containers may include multiple code modules and multiple threads or other code execution entities.

Figure 2A:
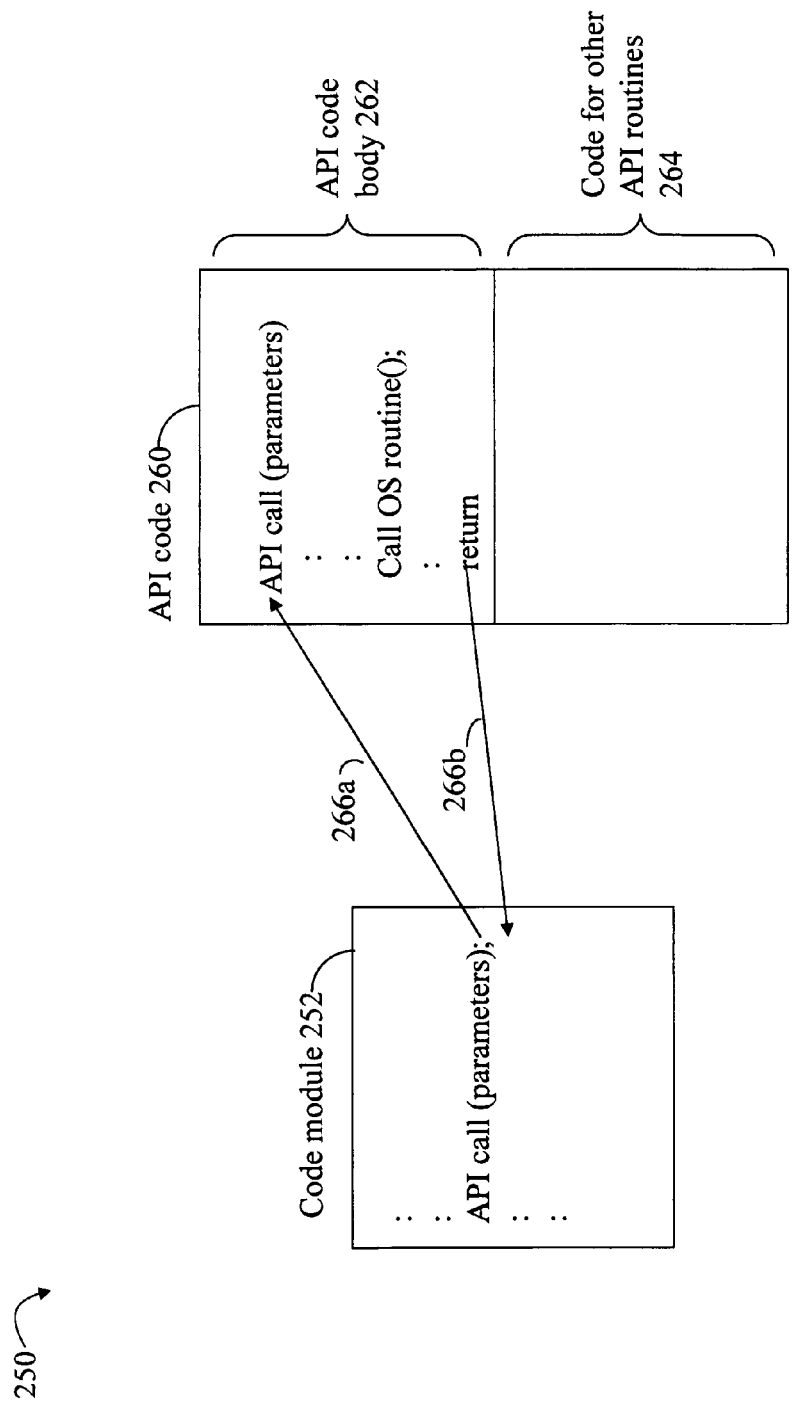
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation, such as a scheduling and synchronization primitive, in connection with the API is not directly available in a native operating system, the functionality may be simulated using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call, such as to dynamically and physically load or unload a module from a container, for use in synchronization such as with locking and unlocking operations with respect to a mutex object (e.g., object use for enforcing mutual exclusion), and the like. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system.

As described in more detail elsewhere herein in one embodiment, the code module 252 may be executing in user space or kernel space and may be executing, respectively, in the context of a U-space or K-space container having its own address space. Described in following paragraphs are techniques that may be used in connection with a code module. In accordance with one aspect, the code module may be characterized as utilizing a universal loadable module interface that may be developed for use in different environments.

It will be appreciated by those skilled in the art that a routine in the API 260 may also be invoked by other bodies of code including, for example, another API routine, operating system code, and the like. In any case, the API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

Code modules included in a system may be developed by multiple developers in different environments. The code modules themselves may be meant for use in different environments. Described herein is a universal or common model for use with such code modules to facilitate use of a same code module in different environments such as, for example, different operating systems, U space as well as K space, and the like. The model as will be described in more detail in following paragraphs has a template or structure including four entry points for which the user or developer provides code. The model also specifies a build process by which an operating system-specific, or more generally, a target specific module executable, such as a binary, may be generated from a user code module, such as a source code module, utilizing the foregoing four entry points. Additionally, the model specifies a runtime aspect where different states may be associated with a module.

In accordance with a first aspect of the model, the code module may include four entry points or handlers—load, start, quiesce, and unload—and code or routine bodies for each of the foregoing entry points. The body of code for each of the foregoing entry points may be expected to perform certain logical processing at runtime in accordance with the model. In an embodiment described herein, the module may be loaded or unloaded dynamically. The module may have a defined life cycle or expected runtime process state model indicating what module processing steps and handlers (e.g., the foregoing four entry points) should be performed relative to one another in a particular ordering.

A description will now be provided indicating what processing may be performed by code associated with the foregoing four entry points in a module. In accordance with techniques herein, a module having the same structure of four entry points/handlers may be used without modification across all environments. In other words, the same developer code mode may be utilized without modification using the API and techniques herein. Each module in accordance with techniques herein may include the four entry points and code for each of the foregoing which is executed when a call is made to the respective entry point.

In connection with the load entry point, processing may be performed to obtain or allocate resources necessary for subsequent processing when the module is executing such as providing a service to a client. Code of the load handler associated with the load entry points may, for example, acquire resources the module needs to operate, acquire a particular amount of a resource (e.g. such as an amount of memory), check that a resource used in module processing is in a particular state (e.g., a particular file, database, directory, and the like exists, is in an expected location, has expected protections or accesses, a particular hardware component is available, has particular characteristics or properties, and the like). As a further example, if a module utilizes a cache, the load handler code may determine a required cache size in accordance with configuration parameters. The load handler, as may be used with the cache or other resource, may acquire configuration information (e.g., read a configuration database or file and parameters). The foregoing configuration information may be obtained using an API provided where the API may use underlying operating system or environment dependent calls to obtain information. The load handler may then acquire the required type and amount of one or more resources such as, for example, by memory allocation, opening a particular file with a required access, and the like.

In connection with the start entry point, the start handler may start performing work or processing as part of initialization and setup using the resources allocated by the load handler.

For example, the start handler may connect or attach to other entities. For example, the start handler may establish a stack of logical device drivers, or perform other processing to initialize resources acquired by the load handler for subsequent module use. The start handler may, for example, initialize a data structure for which memory was acquired by the load handler, create a logical device (so that the module is a provider of the logical device), attach to logical devices exported from other modules (becoming a consumer), create worker threads, and the like. After start handler processing is complete, the module is ready to start performing work or providing a service. For example, if the module is a print driver, the module is in a state where it is ready to accept data to be output to a device.

In connection with the quiesce entry point, the quiesce handler receives requests for the module to stop providing a service or performing work and performs processing to prepare the module to be unloaded. In one embodiment described herein, the quiesce handler may return a boolean value indicating that the module is ready to be unloaded (success) or is not ready to be unloaded (busy still performing work). Once a quiesce handler receives a request, it may take steps to release resources in preparation for subsequent module unloading. For example, after receiving a first quiesce request, the quiesce handler may return busy if there are outstanding work requests being serviced, or if there are other modules listed as consumers of a logical device provided by the module. Such logical devices may be implemented in an embodiment using techniques described in U.S. patent application Ser. No. 12/215,917, filed, Jun. 30, 2008, LOGICAL DEVICE MODEL (also referred to as the LOGICAL DEVICE MODEL patent application), to P. McCann et al., which is incorporated by reference herein. As described in the LOGICAL DEVICE MODEL patent application, the logical device model includes a provider API and a consumer API. Operations performed in connection with implementing the provider and consumer APIs may use the intermodule communication techniques to facilitate communications between different containers as described in U.S. patent application Ser. No. 12/079,759 (the '759 application), filed Mar. 28, 2008, TECHNIQUES FOR INTER-USER-SPACE COMMUNICATION, and U.S. patent application Ser. No. 12/079,822 (the '822 application), filed Mar. 28, 2008, TECHNIQUES FOR USER SPACE AND KERNEL SPACE COMMUNICATION, both of which are incorporated by reference herein. The foregoing techniques may be used in connection with inter module communication as needed for a logical device model regarding consumers and providers executing in different containers in user space and/or kernel space. As described in the LOGICAL DEVICE MODEL patent application, the API may also provide interfaces for use by consumers and providers of logical devices in accordance with an embodiment of a logical device model. As described in the '759 and '822 patent applications, the API may also include interfaces defined and used to facilitate inter-module communication between two code modules in two different containers executing in user mode (U-U communication), or between a first code module of a first container that executes in user mode and a second code module of a second container that executes in kernel mode (U-K and K-U communication). A first code module initiates a transaction or a command request and invokes a second code module. The first code module may also be referred to as a client and the second code module may be referred to as the server. In accordance with the techniques described in the foregoing two patent applications, U-U communications may be utilized when both client and server are different user mode processes or containers, U-K communications may be utilized when the client executes in the context of user mode container and the server executes in the context of the kernel mode container, and K-U communications may be utilized when the client executes in the context of the kernel mode container and the server executes in the context of a user mode container. In connection with the techniques herein, the consumer may be a client which issues requests to the provider as a server and the appropriate intermodule communications may be used depending on the particular mode (e.g., user U or kernel K) of each of the consumer and provider. It should be noted that in connection with communications when both client (such as a consumer) and server (such as a provider) execute in a same container or address space as with K-K communications or when both are included in the same U-space container, communications between such code modules may utilize local procedure calls available for communication within the same container or address space.

In connection with the quiesce handler receiving a first quiesce request and returning busy, the handler may take steps to prepare to unload or prepare to stop providing a service. For example, if the module is a provider of a logical device or a service, the module may not take on any new or subsequent consumers or client requests, may complete any outstanding requests and deallocate resources where possible (e.g., may release resources as outstanding requests are completed). As described, a module may reject a quiesce request (e.g., return busy or unsuccessful) if there are outstanding requests. A module may perform processing as described above in connection with a first quiesce request so that the module takes preparatory steps toward quiescing. When the module receives a subsequent request, the module may have completed outstanding requests, dissolved or discontinued relationships with respect to other modules and/or containers, and the like, and may now be ready for unloading. In response to this subsequent quiesce request, the module may return success so that the module may be unloaded. With respect to the foregoing dissolution of relationships, such relationships may exist where the module is either a producer (e.g., server or provider) or a consumer (e.g., client) with respect to a service, resource, and the like, of another (e.g., another module). As part of processing performed as a result of receiving a quiesce request, a module may dissolve such relationships in preparation for unloading where the existence of such relationships may otherwise prevent a subsequent release of resources (where the actual release or deallocation of the resources may be performed as part of the unload handler processing). As an example, if a first module is a producer of a resource and a quiesce request is received with respect to the first module, the first module may not accept any more consumers or clients which have a dependency on (e.g., utilize) the resource.

In connection with the unload entry point, the unload handler may perform processing associated with unloading the module. The unload handler may perform, for example, releasing of the resources acquired as part of the load handler processing. As an example, the load handler may allocate memory and the unload handler may deallocate, release or free such memory.

A module may be created using an API such as:

(OS) specific module. The same general build processing may be performed utilizing the developer code for the four entry points to produce an OS specific module for the different supported environments as well as for user and kernel space usage. The build process is described in more detail below and may be characterized as a universal way to build the OS specific module (e.g., the build model is same across operating systems and other factors that may vary with different environments).

Prior to discussing the build process and model, a description will be provided with respect to a runtime processing model and module states. At runtime, code of the API may be used to enforce rules of the runtime state model where states may be associated with processing performed at a point in time in connection with a module which executes in the context of a container. One example of typical runtime processing for a module M1 and container C1 may be summarized as follows:

create container C1
    load module M1, C1
    start module M1
    quiesce module M1
    unload module M1
destroy container C1

Other code besides that of the container and the module may be used in connection with performing the foregoing operations with respect to the module M1 being dynamically loaded into container C1. For example, code of a command line interface (CLI) may perform the foregoing operations. Code of the CLI which is executed to perform the foregoing operations of loading, starting, quiescing and unloading with respect to a module (such as module M1) may execute in accordance with a runtime state model that will now be described.

Figure 3:
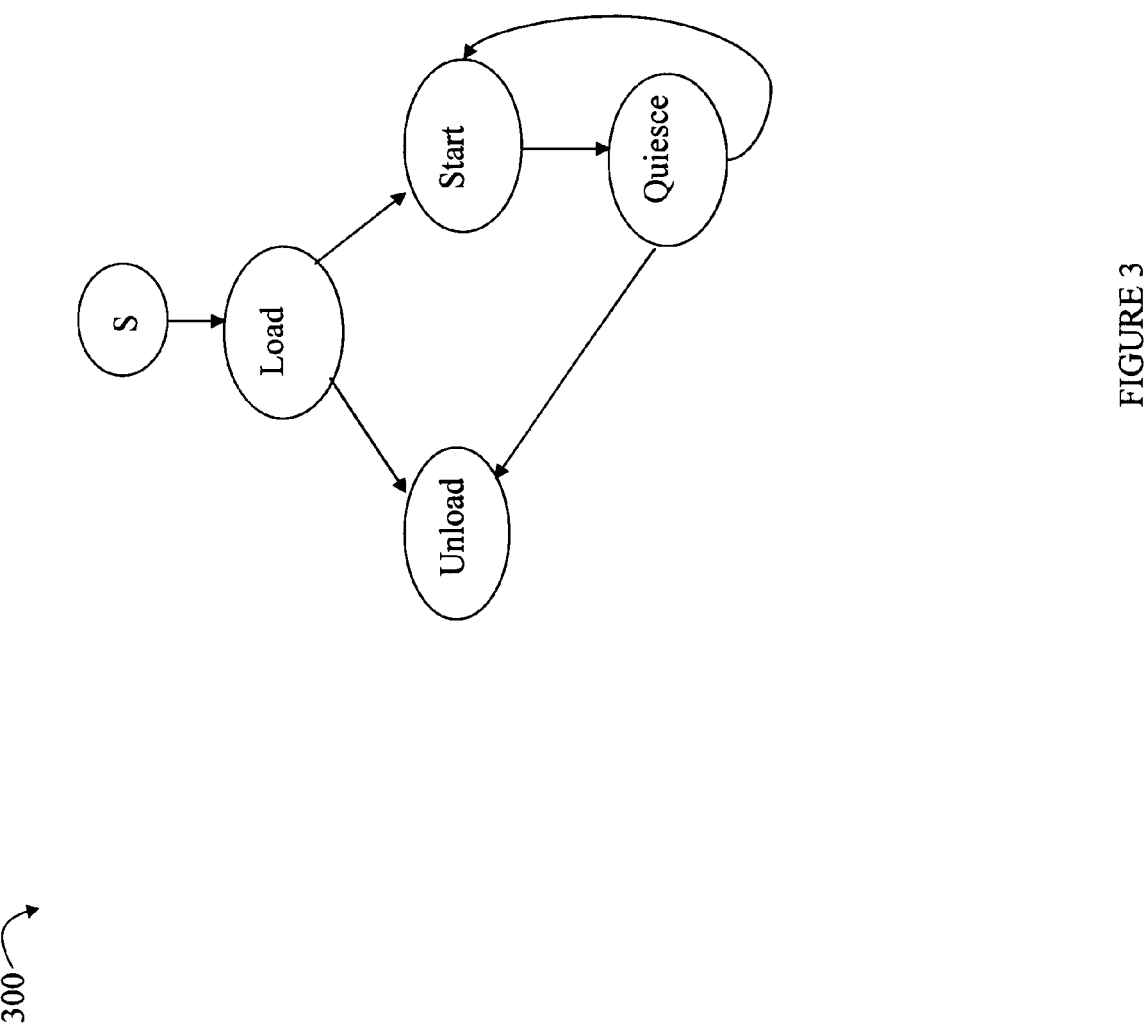
FIGS. 3 and 4 are examples of module state diagrams illustrating modules states in accordance with an embodiment in accordance with the techniques herein.

Referring to FIG. 3, shown is an example 300 of a state diagram that may represent the runtime state model used in an embodiment in connection with techniques herein. States are represented by nodes with transitions between nodes indicated by the directed arrows. Node S represents a start state such as that corresponding to a module prior to loading the

```
CLI _create module (
    &module context,      /* provides module context information as may be used by the API */
    module name,          / * may be a string or other identifier for the module by which the
                            module is subsequently referenced */
    module argument(s),   /* arguments for when invoking the module */
    load,                 /* load call back or handler entry point within the module */
    start,                /* start call back or handler entry point within the module */
    quiesce,              /* quiesce call back or handler entry point within the module*/
    unload                /* unload call back or handler entry point within the module*/
    )
``` where "load, start, quiesce, unload" may be optional arguments that specify the four entry points for the module as described herein. It should be noted that the foregoing API may be one of many APIs included in an embodiment for module management. As an example, the embodiment may also include a destroy_module API invoked to destroy the module created using the above-referenced CLI_create-_module API.

The foregoing four entry points in a module provide a coding structure or template for the module code. The developer provides bodies of code for the four entry points implementing the functionality described. The same code may be used by a build procedure in different supported environments in connection with producing an operating-system module. Other states represented include the start, load, quiesce and unload states. Each of the different states may be associated with a module at a particular point in time as different operations are performed by executing code with respect to the module.

Continuing with the example from above with module M1, the transition to the load state may occur when the module M1 is loaded. From the load state, there may be a transition to the unload or start state. In other words, once the module M1 is loaded, the only valid operations that may be performed with respect to the loaded module M1 are unload and start. Unload may be considered a final or ending state. From the start state, the state may transition to the quiesce state. From the quiesce state, valid transitions are to the start state or unload state. The foregoing states may be used to characterize the state of the module during its anticipated life cycle in connection with execution of other code such as the CLI code. The state of the module M1 will vary depending on the instructions of the CLI code executing at a point in time. In one embodiment, the module M1 may transition to one of the foregoing states of load, unload, quiesce or start when processing associated with the particular state has completed. For example, a module M1 in the load state may indicate that module M1 is physically loaded, and that the load handler and other API code performing processing for the load state have successfully completed.

The CLI code may be used to encapsulate and perform identical processing for the load, start, quiesce and unload operations with respect to the module across different environments such as different operating systems, user space, kernel space, and the like. In one embodiment as will be described in more detail below, the developer code for the different handlers for the entry points of load, unload, quiesce, and start may be invoked when there is a transition into that particular state which corresponds to the entry point. For example, the CLI code may perform processing by invoking appropriate APIs to load a module. Once the module is loaded and as part of transitioning into the load state as illustrated in FIG. 3, the load handler or entry point in the module may be invoked. More detailed examples are provided in following paragraphs and figures to illustrated the common software environment APIs, CLIs, and the like, as may be included in an embodiment implementing techniques herein. It should be noted that once success is returned in connection with quiesce processing, it is assumed that unload processing will not then return busy or failure.

Figure 4:
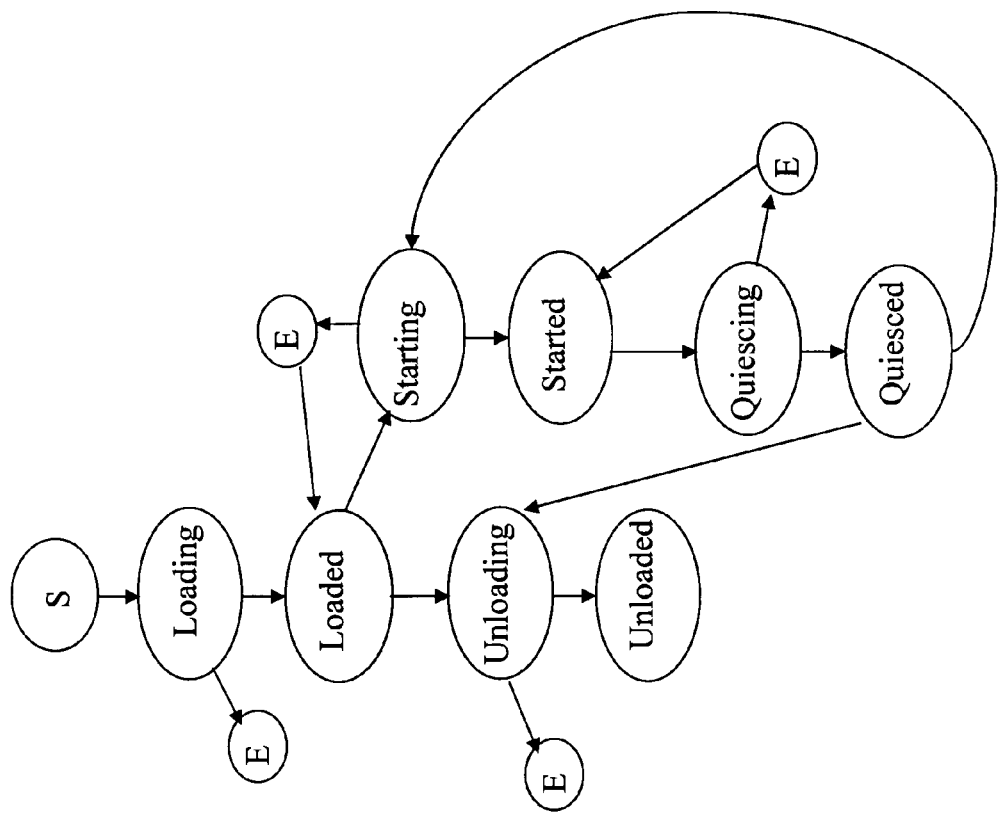

Referring to FIG. 4, shown is an example of another state model that may be used to represent the runtime state with respect to a module. The example 350 uses additional states to elaborate or provide further refinement of module states relative to that illustrated in FIG. 3. In the example 350, E represents a general error state and S represents the start state. The example 350 generally takes each of the states of load, start, unload and quiesce from FIG. 3 and provides two states. A first of the foregoing two states (denoted by ending in "ing" such as "loading" and "starting") indicates that an operation or processing for a state is in progress. A second of the foregoing two states (denoted by ending in "ed", such as "loaded" and "started") indicates that the foregoing processing or operation has completed successfully. If the processing or operation does not complete successfully, the state transitions to the error or E state.

In accordance with another aspect of the model as described herein for a module, build processing may be defined to facilitate combining user code with other code automatically generated to produce an environment-specific module, such as an operating system specific module, that varies with the target environment upon which the module will be executed. The build process may be identical from the developer or user perspective for each of the different environments using the same code module. In other words, in accordance with the model herein, a user may perform the same steps to produce an environment-specific module of executable code that may vary with target environment, such as with the particular operating system of each target environment.

Figure 5:
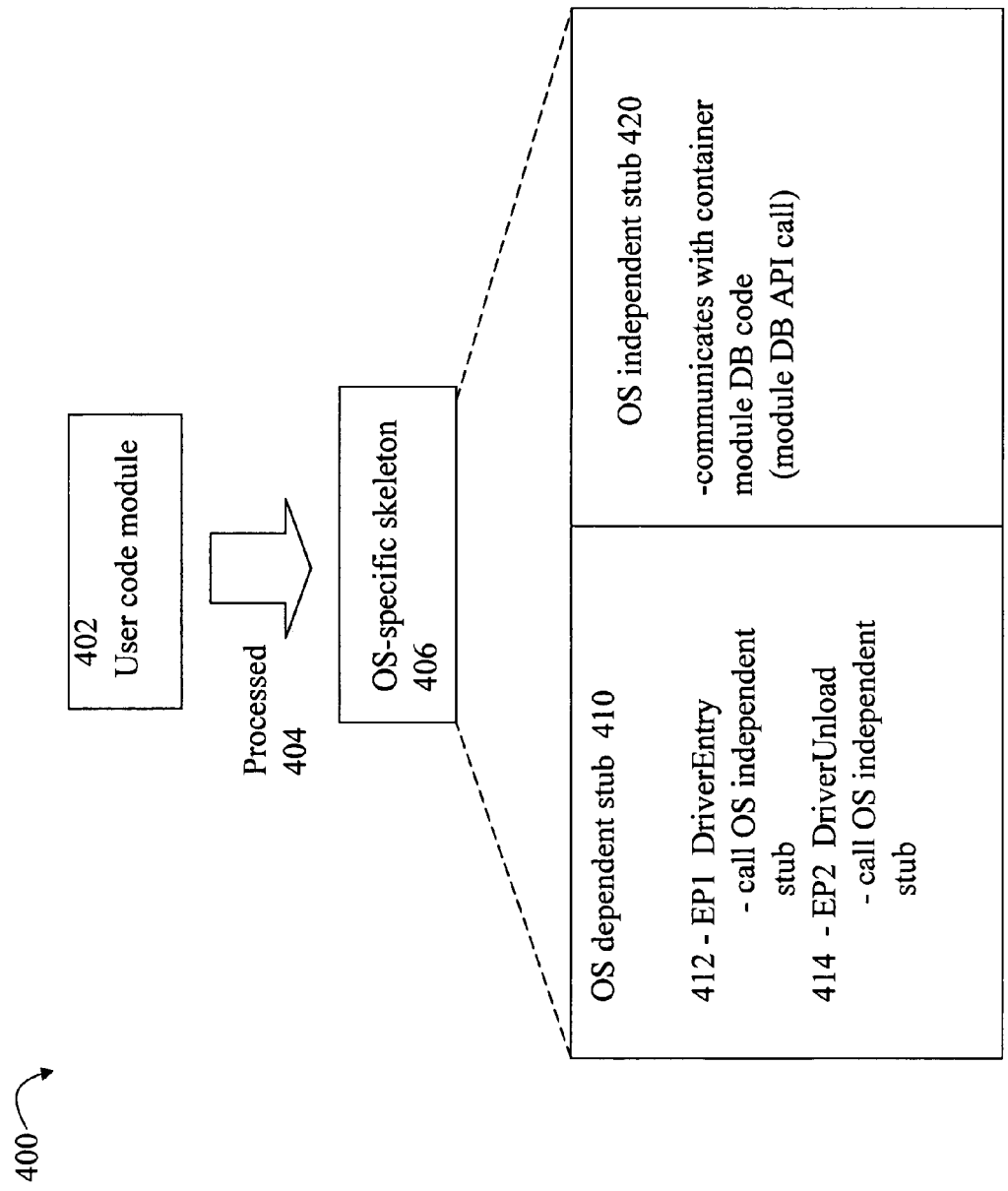
FIGS. 5 and 6 are examples illustrating processing in connection with build processing for generating an operating system specific module in connection with techniques herein.

Referring to FIG. 5, shown is an example illustrating one aspect of the build process for the model in one embodiment in accordance with techniques described herein. The example 400 includes a user source code module 402 which may be processed 404 in an automated fashion using software. The module 402 may be a source code module coded in accordance with the techniques described herein to have the four entry points or handlers and associated code bodies. The processing 404 may include, for example, parsing and analyzing the module 402 to extract information about entry points, etc., as needed for the particular target environment. For example, the processing 404 may include extracting information about the module 402 in order to generate an OS-specific (operating system specific) skeleton 406 of code for use in the target environment. The CSE described herein for each of the different supported environments may include tools which facilitate processing 404 of the module 402 to generate the OS specific skeleton 406 which varies with the target environment.

The example 400 of FIG. 5 provides details of what may be included in an OS specific skeleton 406 for use in a target environment for a Windows-based operating system (e.g., such as Windows NTT™ by Microsoft Corporation) with a module 402 to be loaded and executed in kernel space. Generally, the OS specific skeleton 406 is included in combination with the executable for a user code module to facilitate execution of the module 402 at runtime in accordance with the techniques herein.

The OS specific skeleton 406 may include an OS dependent stub 410 and an OS independent stub 420. The OS specific skeleton 406 includes an OS dependent stub 410 with logic, entry points, etc., that adheres to particular requirements in form and processing of the particular operating system. For example, the stub 410 illustrated includes two entry points 412 and 414 since such entry points are required by the operating system of the target environment and are invoked at different points in time by the operating system. To further illustrate, entry point 412 may be invoked by the operating system in response to the module being physically loaded (e.g., such as the result of invoking the operating system native routine in user space to load a module). As a variation to the foregoing, if the target environment was for user space rather than kernel space, the OS dependent stub 410 may not have any entry points in accordance with the requirements of the target environment consisting of a particular operating system and user space. The OS specific skeleton 406 may vary with the particular operating system of the target environment. Furthermore, the OS dependent stub 410 may further vary with whether the module 402 is being processed to execute in user space or kernel space.

The OS independent stub or portion 420 may not vary with operating system and may be invoked as needed, for example, by the OS dependent portion 410. As will be described in more detail below, the OS independent stub 420 may include code which communicates at runtime with other module code (e.g., the per-container module database (DB) code as included in the CSE for use with each module) to perform processing in connection with operations for load, unload, start and quiesce. As described in more detail elsewhere herein, the per-container module DB code may be included in each container and may perform processing including, for example, updating module state information maintained and used in connection with techniques herein such as enforcing rules for the model state diagram of FIGS. 3 and 4.

Figure 6:
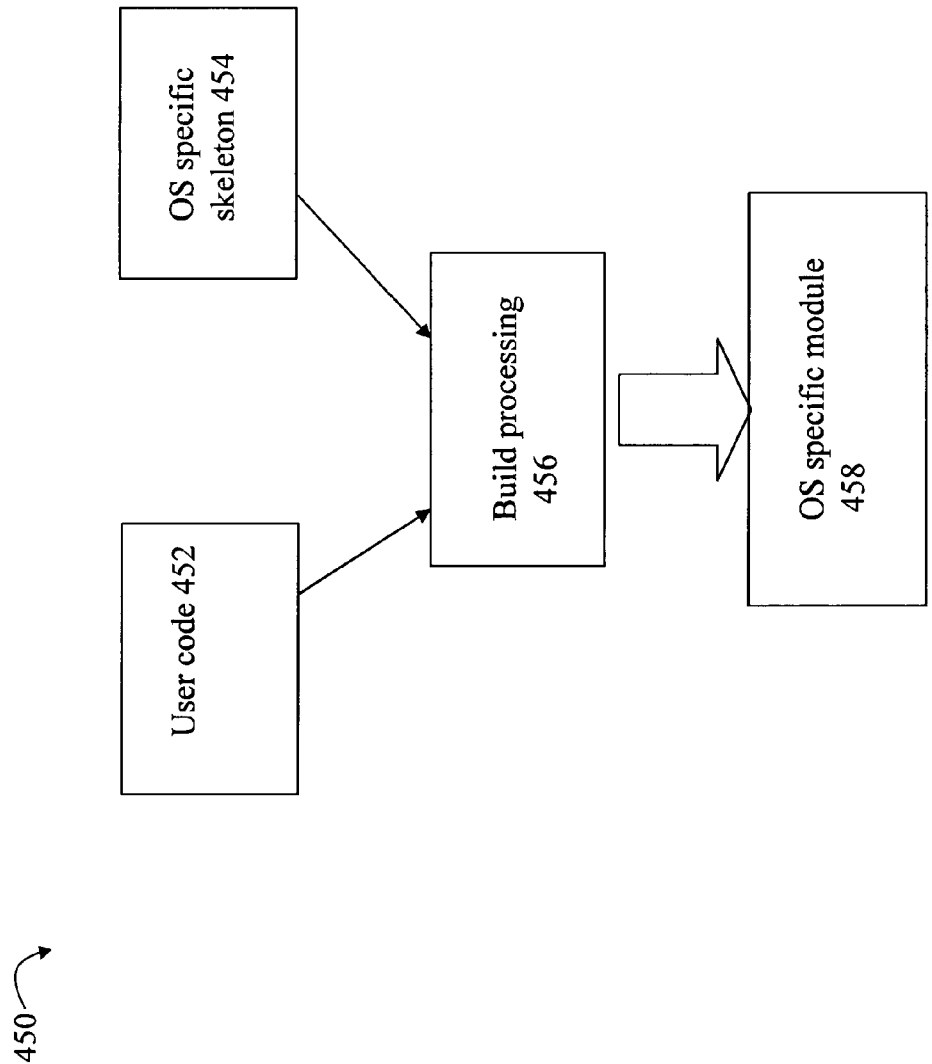

Referring to FIG. 6, shown is an example further illustrating the build processing in accordance with the techniques herein in one embodiment. The example 450 illustrates that, as described above, the user code module 452 (including the four entry points and code bodies as described above) and its associated OS specific skeleton 454 (as generated as a result of processing illustrated in FIG. 5) may be combined along with other code as part of build processing 456 to produce an OS specific module 458. The OS specific module 458 may be, for example, executable code or other intermediate code in a form suitable for use (e.g., loading) in the target environment. For example, the OS specific module 458 may be a .SYS file if the module has a target environment which includes a Windows-based operating system and the module will execute in kernel space. If the module will be executed in user space in a Windows-based operating system, the OS specific module 458 may be a .DLL (dynamic link library) or other form of a shareable library. In connection with the foregoing, both types (.DLL and .SYS files) may be loadable at runtime into an address space. As yet another example, if the target operating system is LINUX, and the module is a driver that will execute in kernel space, the OS specific module 458 may be in accordance with a .KO file (runtime loadable kernel module). If the module will execute in a LINUX operating system in user space, the module 458 may be a .SO (shared object) file (runtime loadable object file).

In connection with the foregoing illustrated in FIGS. 5 and 6, a user code module of source code may be processed in connection with building an OS specific module which can be loaded for use in the particular target environment. The processing may include analyzing the code module to produce an OS specific skeleton. The OS specific skeleton and user code module are combined, along with possibly other code, into the OS specific module customized for use in the particular target environment.

As noted above and for the purposes of illustration, details are provided regarding the OS specific module for use in a Windows-based environment where the user code module will be executed in kernel mode. However, this should not be construed as a limitation of techniques herein and the particular format and information included in an OS specific module may vary with the target environment as noted elsewhere herein.

Continuing with the exemplary OS specific module described in connection with FIGS. 5 and 6 which executes in a Windows-based operating system in kernel mode, reference is made to FIG. 7.

Figure 7:
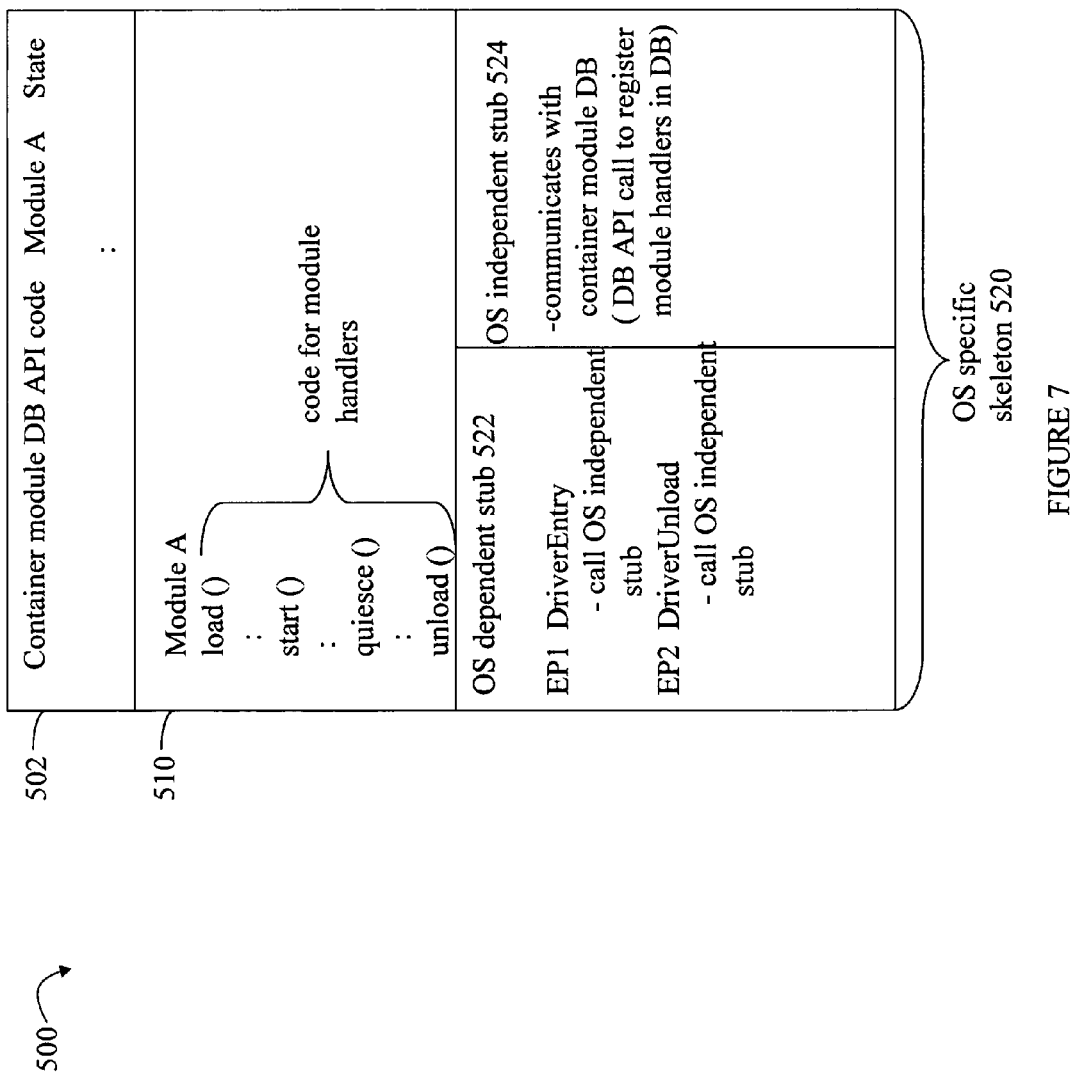
FIGS. 7 and 8 are examples illustrating a container including a module generated in accordance with techniques herein.

Referring to FIG. 7, shown is an example of code that may be included in a container in an embodiment in accordance with techniques herein. The example 500 includes code for the container module DB API code 502, the user module code 510, and the OS specific skeleton 520. As illustrated, the skeleton 520 may include the OS dependent stub 522 and OS independent stub 524. The OS specific module for module A in accordance with techniques herein may include portions of the example 500 indicated by 510, 522 and 524. An embodiment may also include other OS specific module code for one or more other modules. Each such OS specific module may include corresponding portions for 510, 522 and 524 in a manner similar to that as described for module A. Additionally, the container may include a code portion denoted by 502 which facilitates tracking and maintaining module information for modules included in the container in accordance with techniques herein.

As illustrated and described in more detail below, prior to invoking a module handler (e.g., one of the load, start, unload or quiesce handlers in the user code module 510) in accordance with the runtime model, control is transferred to the container module DB API code 502 which performs processing in accordance with the runtime model and manages module state information. For example, the container module DB API code 502 may update module information and the state of the module changes in accordance with the runtime model of FIG. 3. The code 502 may also perform processing to enforce the rules of the runtime model such as ensure that only valid state transitions occur. For example, referring back to FIG. 3, other code such as may be included in a CLI may not quiesce a module which has not been started. Thus, an embodiment may associate the load state of FIG. 3 with a module which has been successfully dynamically loaded at runtime and may only allow processing associated with the start state to occur if processing of the load state completed successfully (as may be indicated by a current state of load). The container module DB API code may perform an intracontainer call to the appropriate module handler in 510 once it has completed its processing. In one embodiment described herein, all calls to the module handlers (e.g., load, start, unload and quiesce handlers of module A) are made through the container module DB API code as just described. That is, control is first transferred to the container module DB API code 502 which then transfers control to the appropriate module handler.

In connection with descriptions provided herein, one of ordinary skill in the art will appreciate the distinction between different module states (e.g., load, unload, etc.) and operations performed (e.g., load, unload, etc.) that may have a same common name. For example, as will be described in more detail herein, the loading and unloading of a module with respect to a container address space, as may be performed dynamically by an operating system, may be characterized as an operation or processing step performed in connection with transitioning to a corresponding module state of loaded or unloaded.

In connection with the particular example of the OS specific module A for execution in a Windows-based operating system in kernel mode, the OS dependent stub 522 may include a first entry point EP1 of DriverEntry which is invoked by the operating system when the module A is loaded. Similarly, the second entry point EP2 of DriverUnload is invoked by the operating system when module A is unloaded.

Figure 8:
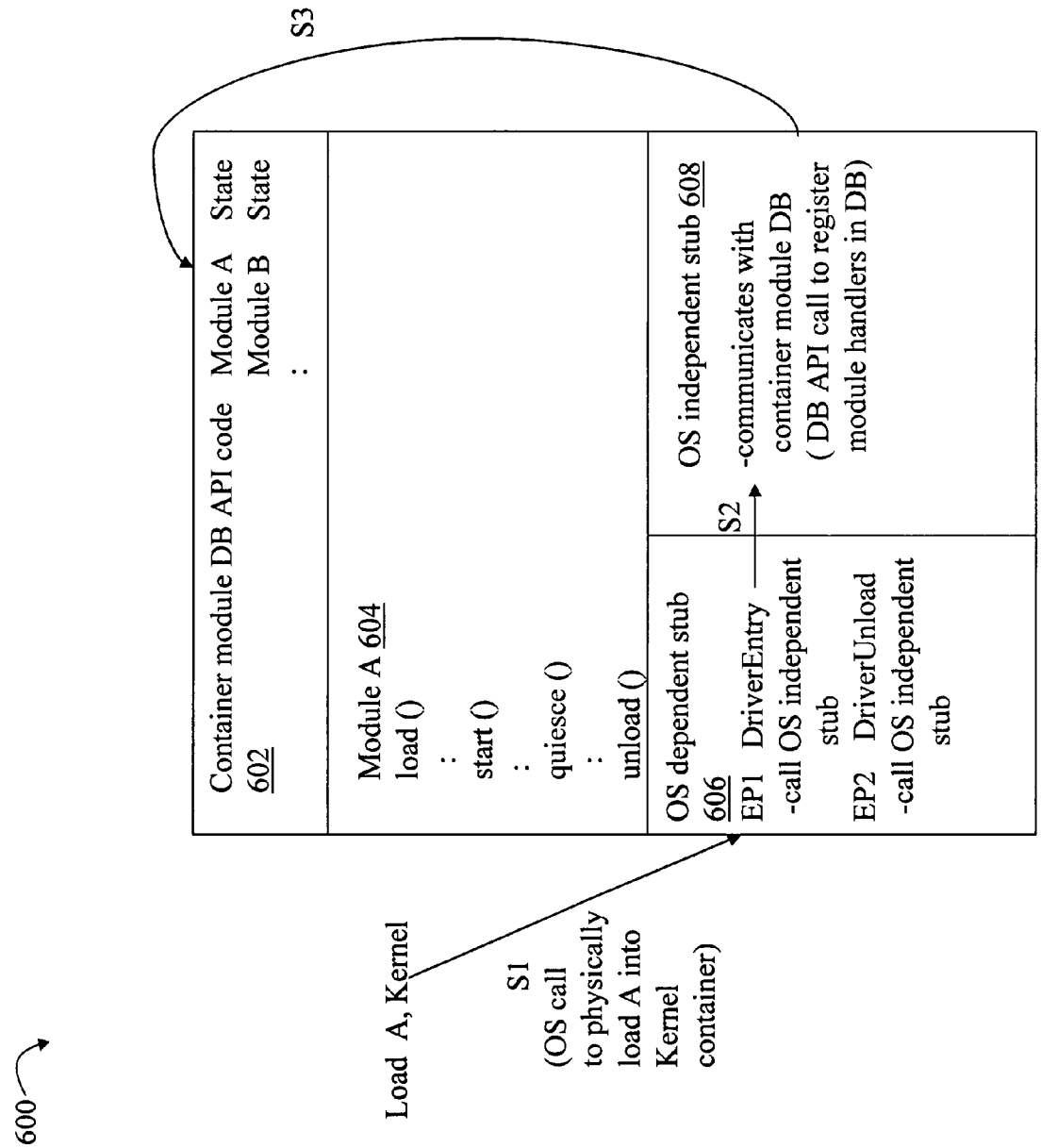

Referring to FIG. 8, shown is an example illustrating the runtime flow of control between code portions of the container code in one embodiment in accordance with techniques herein. The example 600 illustrates that a call may be made (such as using an OS specific native OS call) to load the module A into kernel space of the K (kernel) space container. After the module A has been physically loaded into K space, the operating system may invoke the code of the first entry point EP1 in the OS dependent stub 606 as illustrated by S1. Code of the first entry point EP1 may then perform an intracontainer call to the OS independent stub 608 (as illustrated by S2) which, in turn, transfers control to the container module DB API code 602 (as illustrated by S3). Code of 602 may perform processing as described herein to maintain module information and runtime state. In connection with loading a module, S3 may illustrate a transfer of control to code of 602 which registers the module in the container module DB as may be maintained by the container module DB 602. Control may be returned along the same path by which the call chain is issued. In connection with subsequent processing, the container module DB API code 602 may then facilitate transfer of control to the appropriate handler. This is described in more detail below.

In connection with unloading a module, S1 may illustrate a transfer of control to EP2 rather than EP1. In a manner similar to that as described for loading a module, steps S2 and S3 may be performed. In connection with subsequent processing, the container module DB API code 602 may transfer control to the appropriate handler. In connection with unloading a module, S3 may illustrate the transfer of control to a portion of code in 602 for unregistering the module A from the container module DB.

In following paragraphs and figures, additional detail is set forth to further illustrate use of the techniques herein in connection with the runtime module states of load, unload, start and quiesce with the OS specific module for execution in kernel mode in a Windows-based operating system.

Following is a simplified example for purposes of illustrating techniques herein which creates a series of containers, and then subsequently loads, starts, quiesces, and then unloads modules for the various containers. The foregoing processing may be performed by executing, for example, initialization code of a script which runs a CLI (command line interface) and performs calls into a CLI API. Each such CLI API call may be denoted by a "CLI_" prefix. In the example, the series of containers include the kernel space container (KC) and two user space containers (UC1, UC2). Following is an example of CLI calls that may be made in connection with the initialization script:

```
CLI_create KC           /* The CLI_create API code may perform processing and invoke
                           other API code to create the appropriate containers */
CLI create UC1, UC2
CLI_load m1, KC, args   /* load each module into appropriate container(s) */
CLI_load m2, KC, args   /* Each CLI_load invocation may also call the CLI_create
                           module API described elsewhere herein for each module
                           m1, m2 and m3 to define the four module entry points for
                           the module handlers of load, unload, start, and quiesce for
                           each module*/
CLI_load m3, UC1, args  /* The CLI_LOAD API may also include optional "args"
CLI_load m3, UC2, args  specifying one or more optional arguments for the load
                        handler. Such arguments may be used in connection with
                        resource allocation performed by the handler. */
CLI_start m1, KC        /* start each module */
CLI_start m2, KC
CLI_start m3, UC1,
CLI_ start m3, UC2
CLI_quiesce m1, KC      /* quiesce each module */
CLI_quiesce m2, KC
CLI_quiesce m3, UC1,
CLI_quiesce m3, UC2
CLI_unload m1, KC       /* unload each module */
CLI_unload m2, KC
CLI unload m3, UC1,
CLI_unload m3, UC2
```

Figure 9:
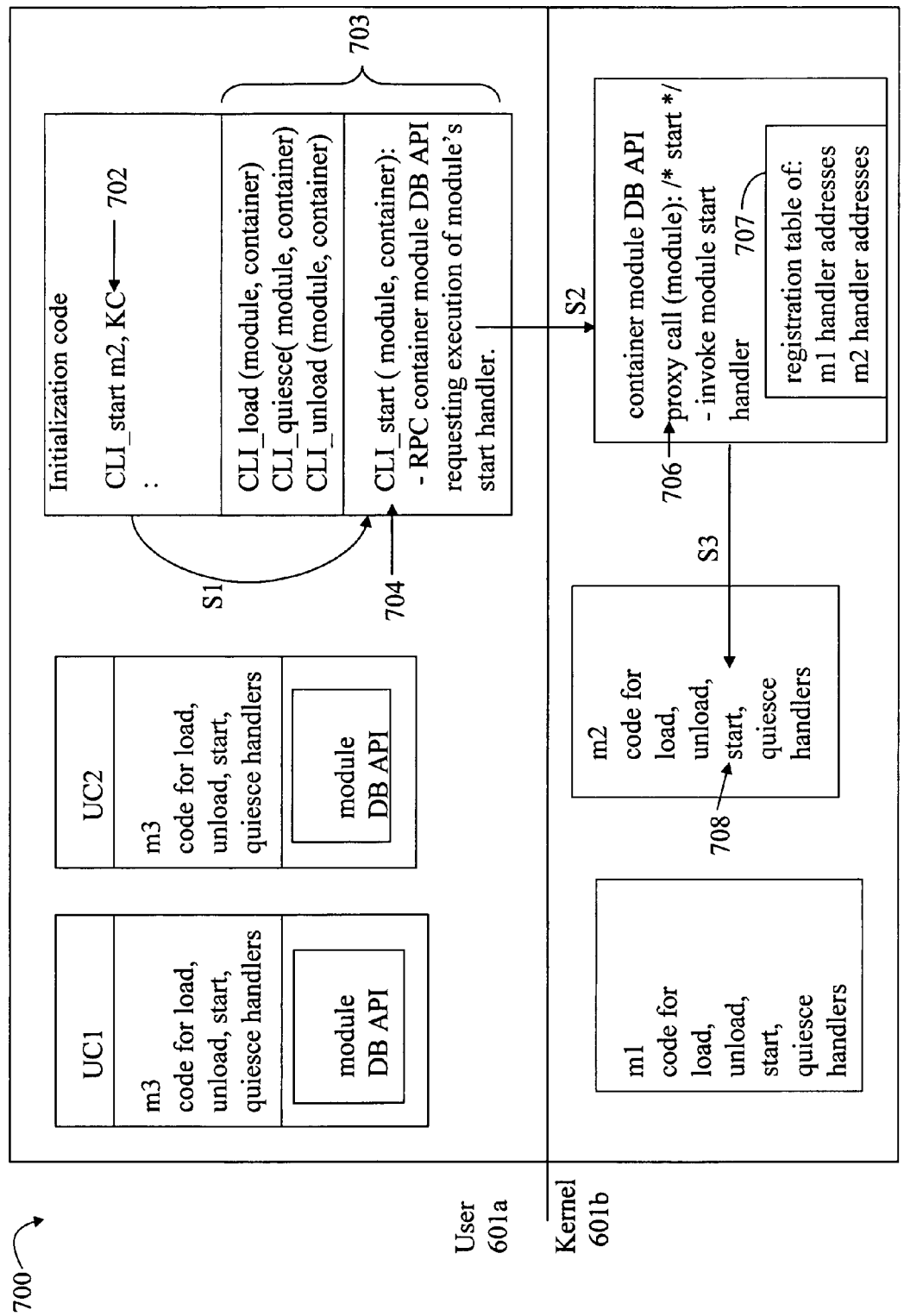
FIGS. 9, 10, 10A, 11, 12 and 13 are examples illustrating flow of control in connection with performing different processing operations in an embodiment in connection with techniques herein where the module is loaded/unloaded into a target container in kernel space.

With reference to FIG. 9, shown is an illustration of the flow of control during execution of CLI calls made from the initialization code described above in accordance with one embodiment of techniques described herein. The example 700 includes user space 601a with user containers UC1 and UC2. Each of UC1 and UC2 has loaded module m3. Kernel space 601b has loaded modules m1 and m2. The example 700 illustrates flow of control and state of the containers when the modules are loaded and the initialization code is executing the statement denoted by 702 to illustrate the runtime control transfer path associated with a start CLI call to transition into the start state for module m2. Element 703 denotes the CLI API code invoked when the initialization code performs a CLI call. In other words, element 703 collectively represents the bodies of code for each of the CLI API calls. In this example, the execution of CLI_start at 702 (to start module m2 of the kernel container KC) causes a transfer of control as illustrated by S1 to the CLI start code at 704. In this embodiment, the CLI API code may utilize a communication mechanism or facility such as a remote procedure call (RPC) facility and inter module communication techniques. The RPC facility used in an embodiment may be in accordance with the RPC API as described in U.S. patent application Ser. No. 12/286,433, filed on Sep. 29, 2008, REMOTE PROCEDURE CALLS, which is incorporated by reference herein. The RPC mechanism and facility described in the RPC patent application includes an API with a client interface and a server interface for performing inter-container calls. In accordance with the techniques herein, the RPC mechanism and facility described in the RPC patent application may be utilized in an embodiment in connection with U-K communications and U-U communications to facilitate intercontainer communications. For example, the techniques described in the RPC patent application may be used to facilitate communications between the initialization code (U-space) and user space containers (UC1 and UC2), and to also facilitate communications between the initialization code (U-space) and kernel space container code.

The RPC facility as described in the RPC patent application may be build on top of, and utilize, a lower level inter-module communication mechanism (for inter-container communication) and technique to facilitate inter-module communication between two code modules executing in user mode (U-U communication between containers), or between a first code module that executes in user mode and a second code module that executes in kernel mode (U-K and K-U communication).

The inter-module communication techniques described in U.S. patent application Ser. No. 12/079,759 (the '759 application), filed Mar. 28, 2008, TECHNIQUES FOR INTER-USER-SPACE COMMUNICATION, and U.S. patent application Ser. No. 12/079,822 (the '822 application), filed Mar. 28, 2008, TECHNIQUES FOR USER SPACE AND KERNEL SPACE COMMUNICATION, both of which are incorporated by reference herein, may be used in connection with inter-module communication between containers as needed to implement the RPCs for inter-container communications. As described in the '759 and '822 applications, the API may also include interfaces defined and used to facilitate inter-module communication between two code modules in different containers executing in user mode (U-U communication), or between a first code module that executes in user mode and a second code module that executes in kernel mode (U-K and K-U communication). A first code module initiates a transaction or a command request and invokes a second code module. The first code module may also be referred to as a client and the second code module may be referred to as the server. In accordance with the techniques described in the foregoing two patent applications, U-U communications may be utilized when both client and server are user mode processes, U-K communications may be utilized when the client executes in user mode and the server executes in kernel mode, and K-U communications may be utilized when the client executes in kernel mode and the server executes in user mode. In connection with the techniques herein, the client may issue requests to a server to perform a remote procedure call and the appropriate inter-module communications may be used depending on the particular mode (e.g., user U or kernel K) of each of the client and server.

In accordance with the techniques described herein, a code module may be executed using a communications model (such as the inter-module and inter-container communications described above in the '759 and '822 applications) and RPC mechanism and facility (as described in the RPC patent application), where interfaces and associated code for all of the foregoing may be embodied in the API in both user space and kernel space meaning that the same set of operations are available in user space and kernel space. In one embodiment, the API may include code and interfaces as described herein as well as the RPC facility and API of the RPC patent application, and the inter-module communications model and API for inter-container communications as described in the '822 and '759 applications. Code may be written using this API including a defined interface that provides code portability across user and kernel mode in all supported environments.

With reference to FIG. 9, execution of statement 702 causes transfer of control to 704 (as illustrated by S1) to code of the CLI_start API. Code of 704 may perform a RPC to the container module DB API code of the kernel container (KC) as illustrated by S2 at point 706. At 706, the container module DB API code may perform processing to enforce the rules of the module state as illustrated, for example, in FIG. 3 and then invoke the module start handler at 708 as illustrated by S3. It should be noted that, although not explicitly included in illustrated examples herein, code of the container module DB API may perform processing to enforce rules of the module runtime state as illustrated, for example, in FIG. 3 and take appropriate action in the event there is an attempt to perform an improper state transition. Otherwise, processing may proceed as described herein with allowable or appropriate runtime module state transitions.

Illustrated in FIG. 9 is the flow of control associated with the CLI start API code. It should be noted that the start and quiesce CLI code work similarly by using an RPC or other inter container communication mechanism to communicate with target container module DB API code. As illustrated in FIG. 9, the container module DB API code of the target K-space container acts as a proxy to facilitate invocation of the appropriate module handler as registered with the container module DB API.

As will be described in following paragraphs, when a module is loaded into a container as a result of the Cll_load API invocation, the load, unload, start, and quiesce handlers of the loaded module are registered with the container module DB of that container. For example, when the modules m1 and m2 are loaded into the KC, the addresses of the module handlers are registered (see element 707) with the container module DB API code of the kernel container. The foregoing registration allows the container module DB API code of the KC to act as a proxy for the foregoing module handlers and appropriately transfer control, for example, in connection with a subsequent RPC call for the CLI start, CLI quiesce and CLI unload of the modules m1 and m2. The same usage of the container module DB API code acting as a proxy occurs for each target container whether the target container executes in user space or kernel space and for each operating system.

It should be noted that the module handler returns a return value which is propagated back up the call chain. For example, as described herein, the quiesce module handler may return a value of success or failure (busy) which is propagated back up the call chain. The flow of control performed by the CLI_quiesce API code of 703 is similar to that as described and illustrated for the CLI_start API code with the difference that processing is performed for the quiesce state and control is transferred to the quiesce module handler of m2 in kernel space. The foregoing return value from a module handler may also be used by the DB API code to detect and perform any appropriate state transitions.

Figure 10:
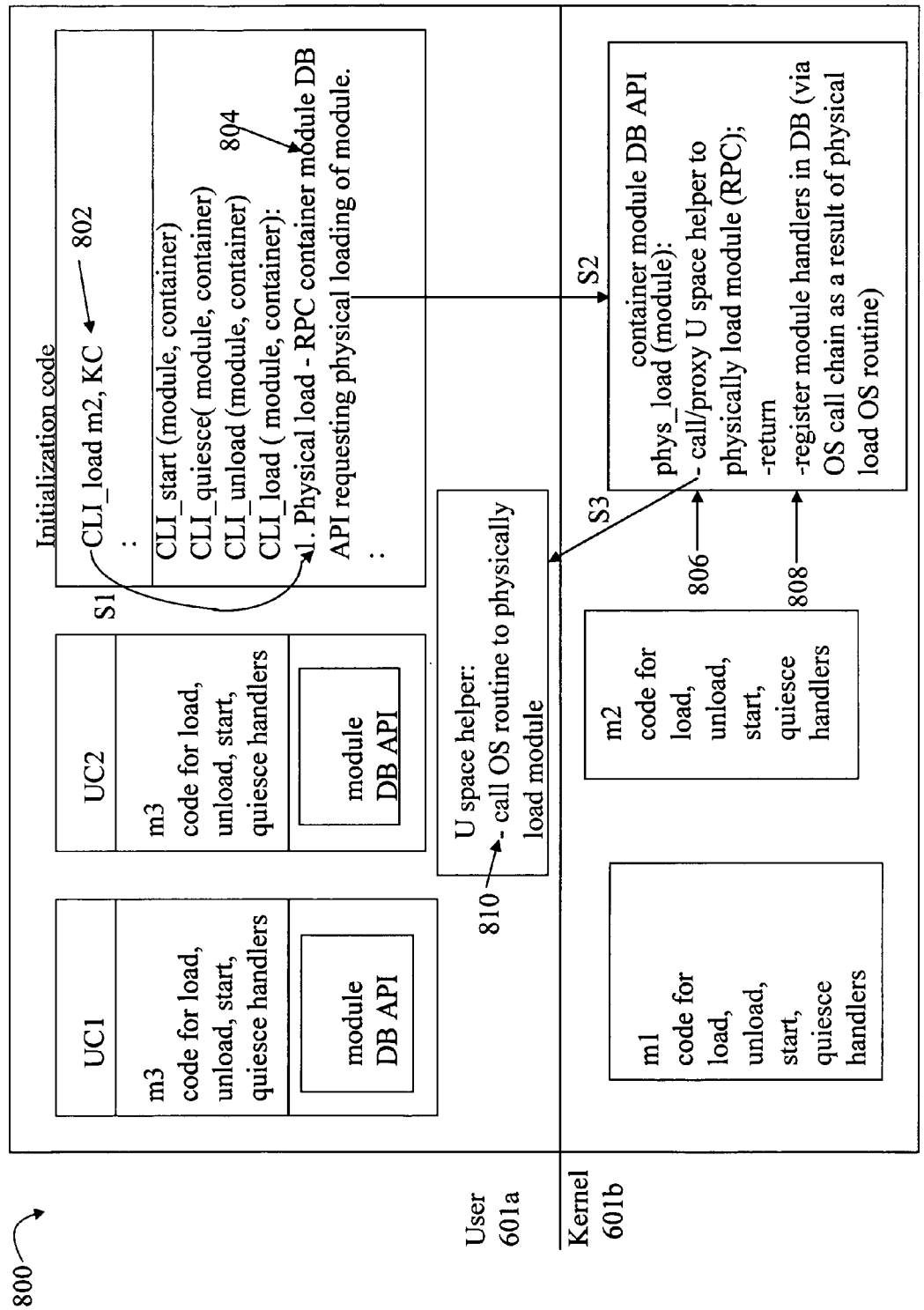
Figure 11:
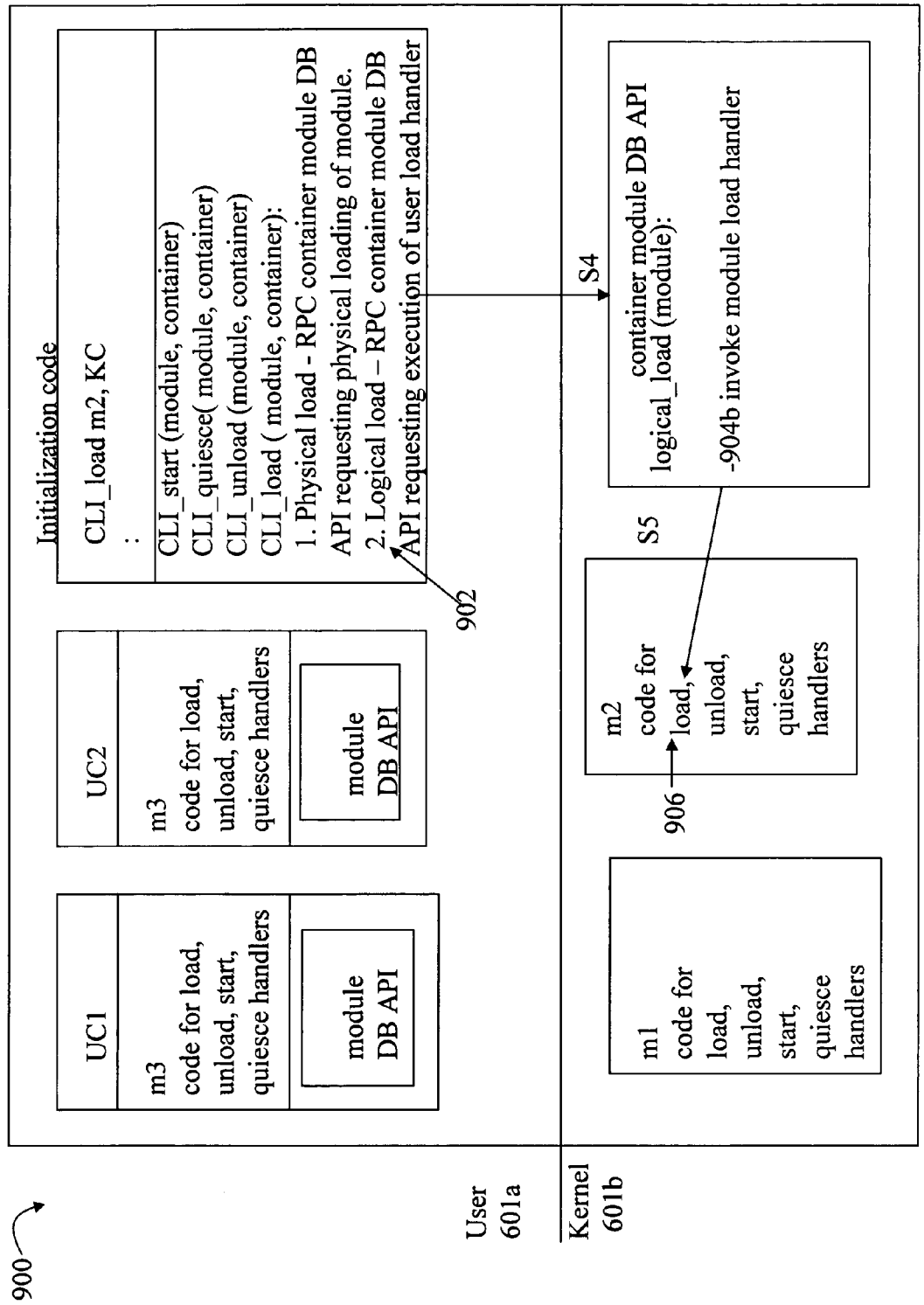

What will now be described with reference to FIGS. 10 and 11 is processing performed in connection with the load module state by the CLI_load API code. In connection with the CLI_load API code, the load processing may be partitioned into a two part operation including physical loading and logical loading. The physical loading refers to physically and dynamically loading the module into the appropriate target container's address space. Physical loading may also be characterized as a dynamic load call to load or inject the module into a container's address space. The logical loading may include performing processing such as invoking the module load handler provided the physical loading was completed successfully.

With reference to FIG. 10, execution of statement 802 causes transfer of control to 804 (as illustrated by S1) to code of the CLI_load API to perform processing for the physical loading of the requested module into a container's address space. Code of 804 may perform a RPC to the container module DB API code of the kernel container (KC) as illustrated by S2 at point 806. At 806, the container module DB API code may initially create an entry in the module table (described in following paragraphs) for the module being loaded. At 806, processing may also be performed to enforce the rules of the module state as illustrated, for example, in FIG. 3 and then invoke the user space (U space) helper code (as illustrated by S3) to physically load the requested module. The transfer of control to point 810 in the U space helper code as illustrated by S3 may be facilitated using RPCs from a K-space container to a U-space container. At point 810, the U space helper may invoke the OS native routine to physically load the requested module m2 into kernel space. It should be noted that the OS native routine to physically load a requested module in a dynamic fashion may only be invoked from user space. Thus, this is why the container module DB API code of the kernel container performs the foregoing transfer to the U space helper code. In an embodiment the U space helper may be included in another user space container.

With reference back to FIG. 8, as a result of invoking the OS native routine to physically load a module at point 810, the operating system dynamically loads the module m2 into the kernel space container's address space and then transfers control to the entry point EP1 in the OS dependent stub of module m2. Processing proceeds as described in connection with FIG. 8 resulting in a transfer of control to the OS independent stub (not illustrated in FIG. 10) of module m2 and then to the container module DB API code at point 808 to register the module m2's handlers in the container module DB. At this point, there is a return back up the call chain as follows:

KC container module DB API code 808
OS independent stub of module m2
OS dependent stub of module m2
OS native routine to dynamically load m2

U space helper at 810

KC container module DB API code 806

CLI_load API code of initialization code at 804, RPC to perform physical load complete/return.

Figure 10A:
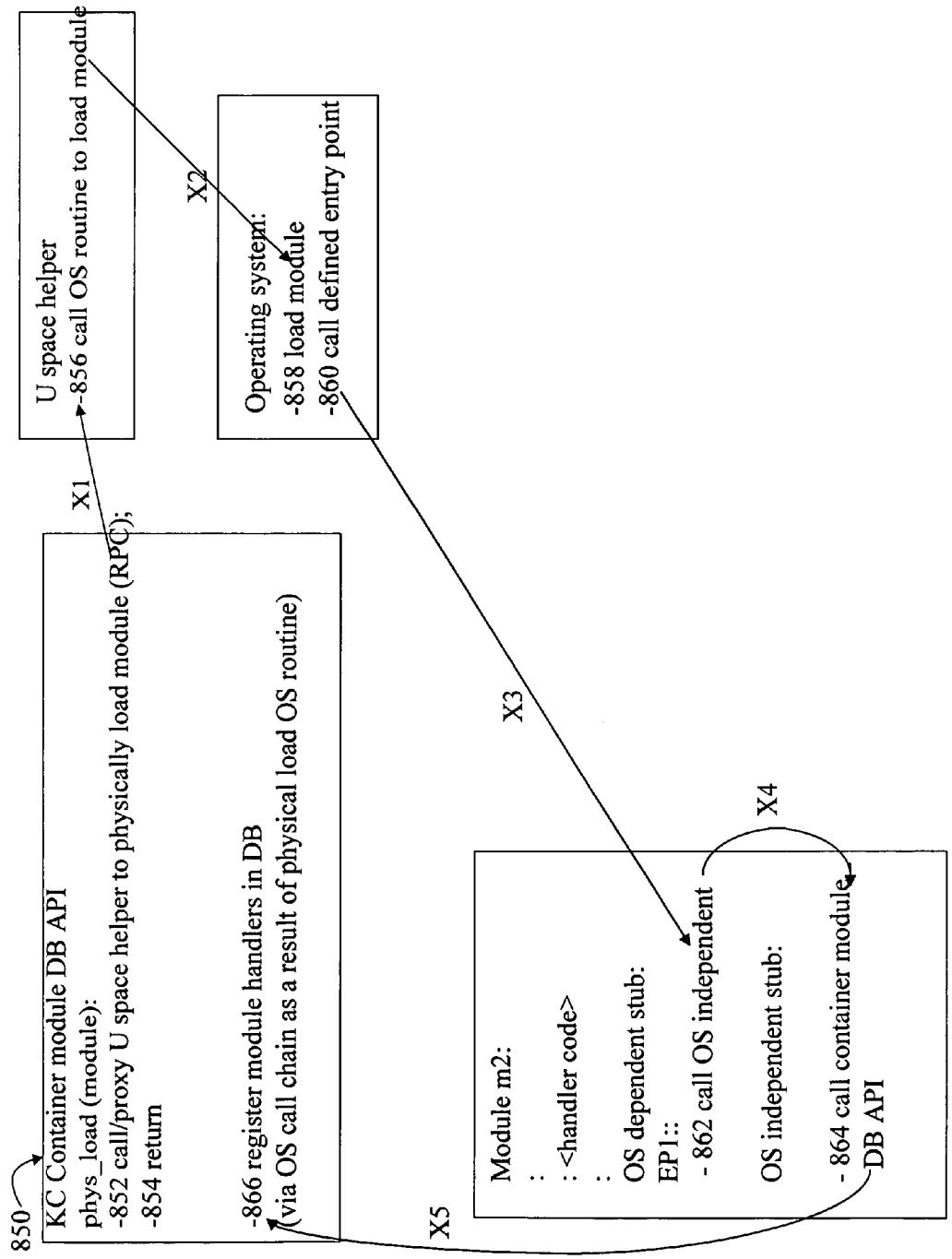

The foregoing call chain and transfers of control in connection with processing to load a K space module is further illustrated in FIG. 10A. The example 850 further illustrates the processing just described between code portions of FIG. 10. At step 852, the call or proxy to the U space helper is performed at step 852 resulting in a transfer of control to step 856 as illustrated by X1. At step 856, the U space helper issues the OS native call to dynamically load the requested module m2 into kernel space as illustrated by X2. At 858, the operating system loads module m2 and then calls (as illustrated by X3) the defined entry point in the OS dependent stub of module m2 at 862. Execution of 862 results in transfer to the OS independent stub at 864 (as illustrated by X4). Execution of 864 results in transfer of control to point 866 (as illustrated by X5). As part of step 866, processing may be performed to register the module m2 handlers such as record the address of the m2 handlers so that subsequent RPCs to the kernel container's module DB API code can appropriately transfer of control to m2 handlers. The handler addresses may be obtained using an appropriate OS native routine, obtaining a symbol address as provided through symbol address resolution by a linker, or any other suitable means that may be available in an embodiment.

The foregoing described in connection with FIGS. 10 and 10A illustrates the physical dynamic loading of the requested module into K space.

Referring now to FIG. 11, shown is an example illustrating the second portion of the CLI_load processing for the logical load processing that may be performed in an embodiment in connection with the techniques herein. The example 900 is the logical load processing that may be performed with respect to logical load processing for loading a module into K space. The logical load processing at 902 is performed after the physical module load processing just described in connection with FIGS. 10 and 10A. From step 902, an RPC is performed from 902 to the container module DB API code of the kernel container (illustrated by S4) resulting in a transfer of control to 904b where the container module DB API code of the kernel container transfers control (via intra module or local routine call) to the appropriate load handler of module m2 (denoted by 906).

It should be noted that the flow of control from point 902 in the CLI API code for the logical load processing is similar to that as described in connection with the start and quiesce CLI API code processing. That is, control is transferred to the target container module DB API code which acts as a proxy in transferring control to the appropriate module handler.

Figure 12:
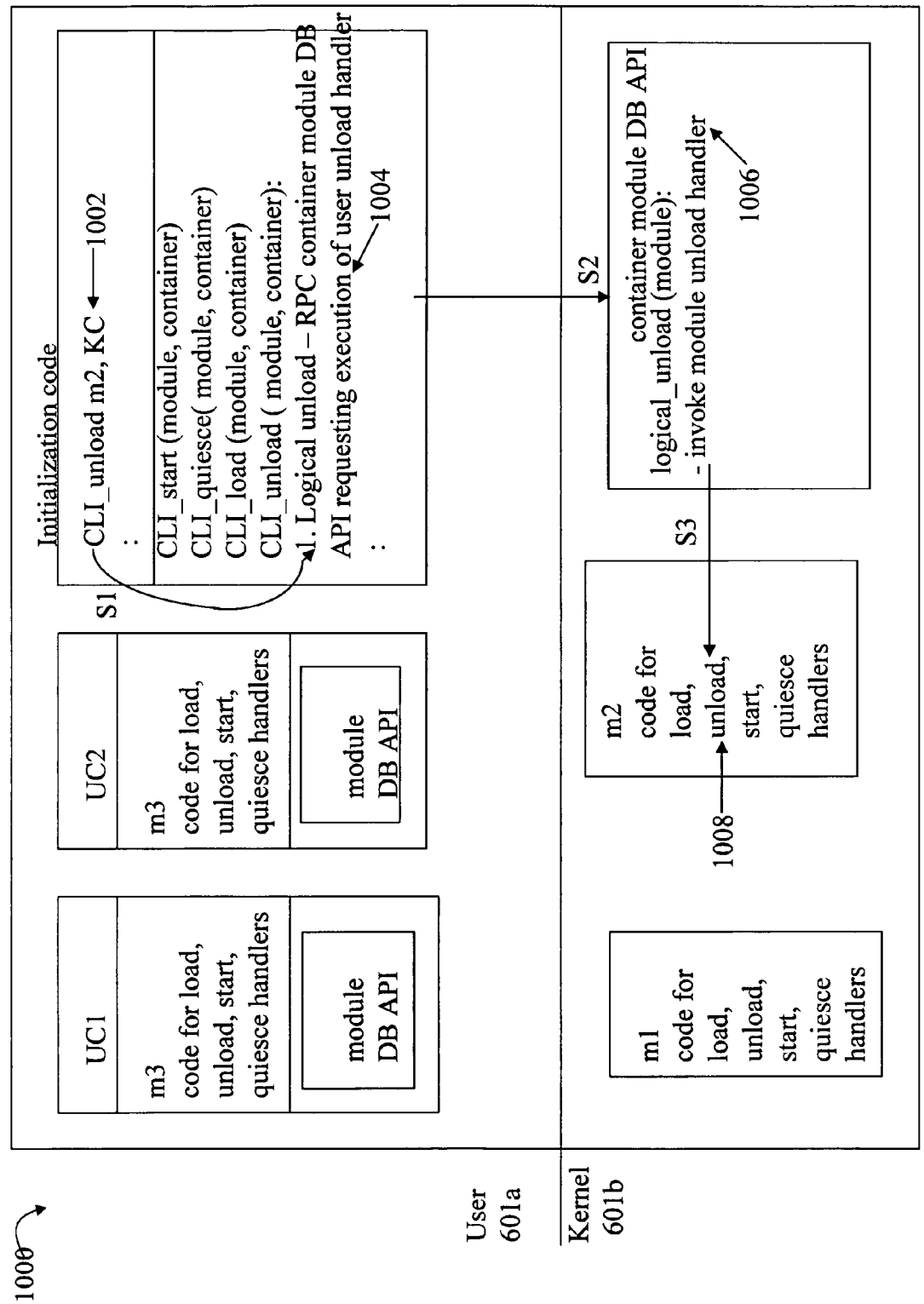
Figure 13:
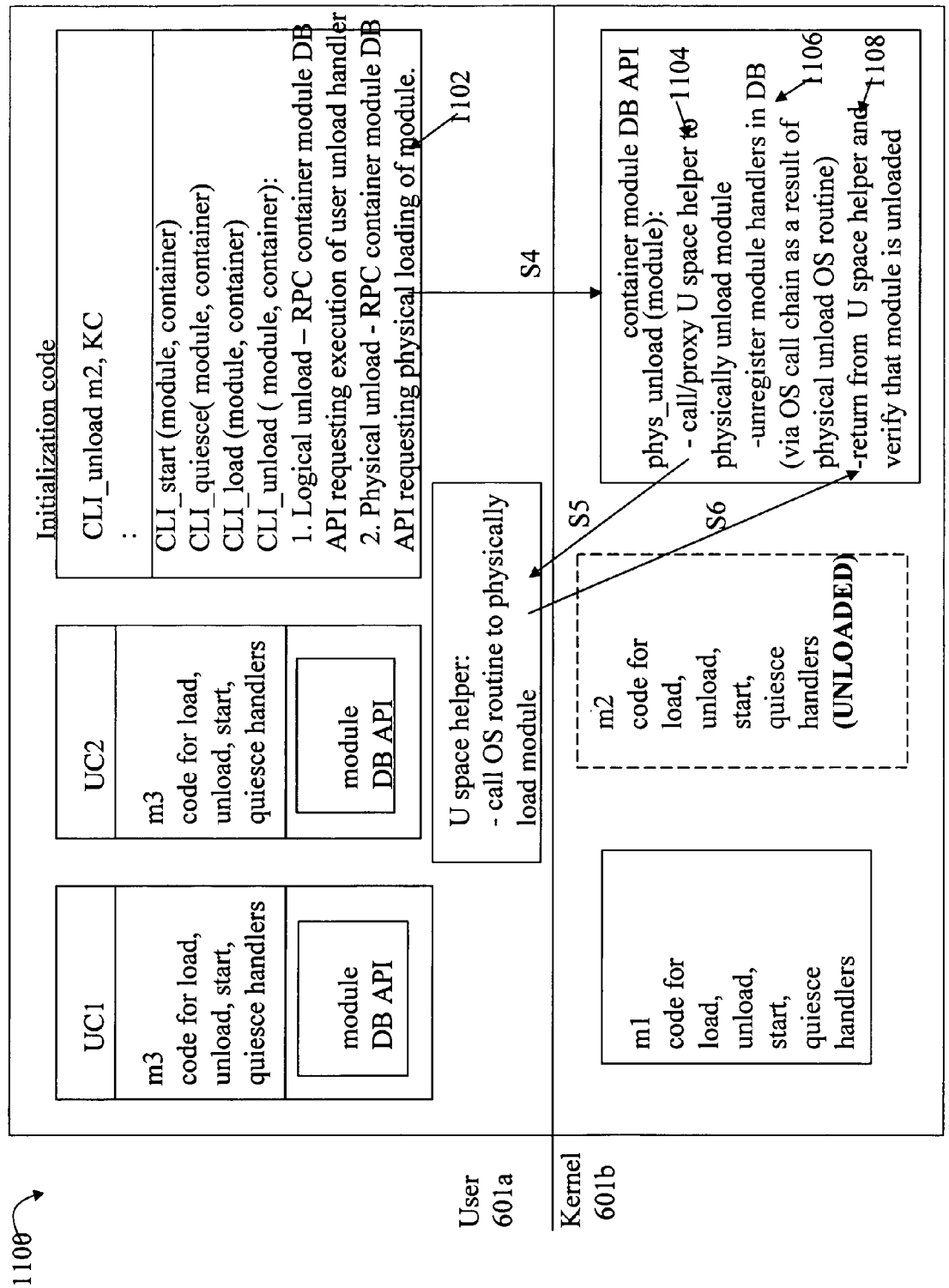

Referring to FIGS. 12 and 13, processing will now be described in connection with unloading a module from a kernel space container. It should be noted that the unload processing illustrated in FIGS. 12 and 13 is processing that may be performed in connection with CLI_unload processing partitioned into two portions as described above in connection with the CLI_load processing. CLI_unload processing may include performing logical unload processing and physical unload processing. Physical unload processing may dynamically and physically unload the requested module from a container's address space. Logical unload processing may logically unload a module from the data structures, and the like, as described herein used by the container module DB API code.

With reference to FIG. 12, the initialize code may execute a CLI_unload API call at 1002 which transfers control (as illustrated by S1) to the logical unload CLI code at 1004. At 1004 the logical unload processing is performed where an RPC is used to transfer control (as illustrated by S2) to the kernel container module DB API code at 1006. At 1006, the appropriate m2 unload handler is invoked (as illustrated by S3). Control is returned following point 1006 where processing is performed to unregister the module in the kernel container module DB.

With reference to FIG. 13, after logical unload processing is completed, the CLI_unload API code performs physical unload processing denoted by 1102. At 1102, an RPC is performed to transfer control (as illustrated by S4) to the kernel container module DB API code at 1104. In a manner similar to that as described with the load processing, the DB API code of the kernel container transfers control (as illustrated by S5) from 1104 to the U space helper. The U space helper executes the operating system native call to unload the requested module m2 from the kernel space container. As a result, with reference back to FIG. 8, the operating system transfers control to the second entry point EP2 in the OS dependent stub of module m2. Code of the entry point EP2 transfers control to the OS independent stub of module m2 which then transfers control to the kernel container's module DB API code at step 1106 to unregister the module as illustrated in FIG. 13. Thus, step 1106 is executed indirectly via an operating system call to the OS dependent stub of module m2. For example, unregistering of step 1106 may include removing the module from the list of modules registered as being included in the container. Additionally, any information for the module stored by the per container module DB API code may also be removed.

The foregoing call chain then returns or unwinds to step 1108 where processing may be performed to verify that the module has been physically dynamically unloaded from the kernel container.

In connection with the foregoing processing for dynamically loading and unloading a module from a container where the container as illustrated is in kernel space, the U space helper code is invoked via an RPC requesting issuance of a native operating system call to load or unload the module.

Figure 14:
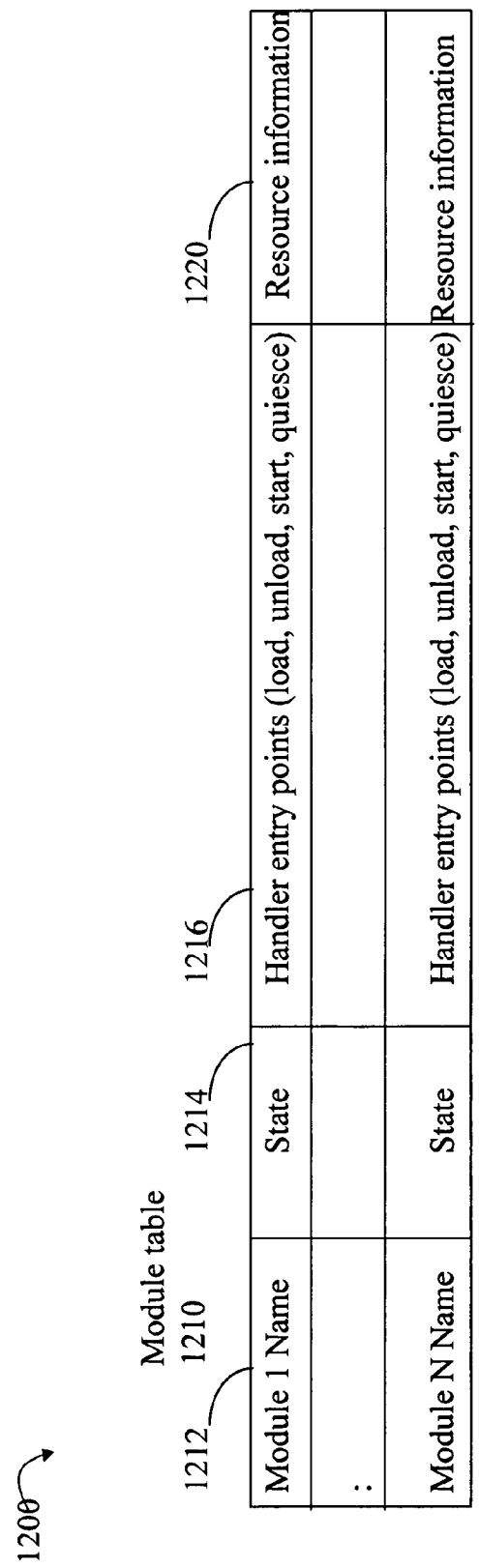
FIG. 14 is an example illustrating a representation of a module table that may be used in an embodiment in connection with techniques described herein.

Referring to FIG. 14, shown is an example illustrating a table of module information that may be maintained and used by the per container module DB API code in an embodiment in connection with the techniques herein. The example 1200 includes a module table 1210 with an entry or row of information for each module. Each entry for a module may include a module name 1212, a module state 1214, address of the module handlers 1216 and resource information 1220. The state 1214 may represent a current state of the module associated with the entry in accordance with module states, for example, defined in accordance with a state module such as illustrated in FIG. 3, FIG. 4, or some other model and defined states that may be used in an embodiment. Registering a module as part of processing described herein in connection with load processing (e.g., step 808 of FIG. 10) may include creating and initializing an entry in the table 1210, recording the handler entry points or addresses, updating the state 1214, and the like.

An embodiment may track within the table 1210 resources utilized by a module as illustrated by 1220. Every time the module allocates a resource, the table 1210 may be accordingly updated. The table 1210 may track as a list the resources individually allocated and used by the module. Alternatively, an embodiment may use a Boolean value or counter to indicate whether any resources are allocated for the module for purposes of techniques herein. In connection with the foregoing resource usage and allocation, an embodiment may perform other verification processing. For example in connection with unload processing, the per container module DB API code may check to see whether resources utilized by the module have been deallocated. The module may also utilize API calls provided by the CSE environment described herein and such API calls may also track information as to when a module is allocating/deallocating resources and appropriately update the table 1210. Prior to unloading the module, a check may be made (such as by code of the per container module DB API) to ensure that resources have been properly deallocated in order to allow the unload processing to proceed. The foregoing check may be made prior to invoking the user's unload handler.

The per container module DB API code may use the information in the table 1210 to determine a current state of a module and use the foregoing information to enforce rules which only allow valid state transition to occur in accordance with a define state model. As mentioned elsewhere herein, the enforcement of such rules in accordance with a state model may be performed by code of the per container module DB API such as, for example, when the CLI_start API code transfers control to the DB API code of the target module via an RPC prior to invocation of the loaded module start handler, when the CLI_quiesce API code transfers control to the DB API code of the target module via an RPC prior to invocation of the module quiesce handler, when the CLI_load API code transfers control to the DB API code of the target module via an RPC to physically load the requested module, when the CLI_unload API code transfers control to the DB API code of the target module via an RPC to logically un load the requested module, and the like. At the foregoing points prior to performing processing, verification may be performed to ensure that the module is currently in one of the allowable states for the requested transition and error processing may be performed for invalid requested state transitions. The particular points at which the state verification processing and/or updating of module state information are performed may vary with embodiment. The foregoing may vary, for example, with the particular granularity of the states utilized in an embodiment. For example, a first embodiment may use a state model in accordance with FIG. 3 and a second embodiment may use a state module in accordance with FIG. 4. The processing for updating and verifying appropriate state transitions may vary with the foregoing two embodiments.

To further illustrate, an embodiment may use the state diagram as illustrated in FIG. 3. Using such a state diagram to indicate valid state transitions, an embodiment may not transition into a new state until all processing for that state is completed. For example, with reference to FIG. 3, do not transition into the LOAD state until both physical and logical load processing are completed. For an embodiment using a state diagram with further refined states as in FIG. 4, the embodiment may set a module state as follows for module load processing:
<state LOADING>/*loading processing started */
physical load processing
logical load processing
<state LOADED>/*Loading complete */
Unload associated states are set in a manner similar to that as for load processing note above.
States associated with start processing may be set as follows:
<state STARTING>/*starting processing commenced */start processing
<state STARTED>/*starting processing complete */
Quiesce associated states are set in manner similar to that as for start processing noted above.

In an embodiment in accordance with techniques herein, a single CLI command may correspond to a single CLI API call. As such, if a CLI command is implemented in two steps such as with the load and unload module processing described herein, the second step of the processing may not be performed if the first step is not successfully performed.

In connection with the load and unload processing examples described above, the module is illustrated as being loaded and unloaded from the kernel space container. In this case where the target container is in kernel space (e.g., module is being loaded/unloaded from kernel space), the U space helper is invoked to perform the operating system native call for the dynamic module loading or unloading operation. It should be noted that if the target container is in user space (e.g., module is being loaded/unloaded from user space), the U space helper is not needed. Rather, the operating system native call may be performed directly from the target container's module DB API code. It should be noted that the processing performed in connection with the start and quiesce are as described above where the target container is a kernel space container with the difference that the appropriate inter-container communication technique, such as appropriate RPC, may be performed where the target is a user space container (e.g., use appropriate RPC calls and U-U intercontainer communications).

Referring to FIG. 15, shown is an example illustrating in more detail processing performed in an embodiment in accordance with techniques herein where the target container is a user space container. The example 1300 describes processing that may be performed by the container module DB API code when the target container is in user space. In connection with load processing, the physical loading at step 1302 may directly call (at step 1303) the native operating system routine to dynamically physically load the requested module. At step 1306, a call may be made to the native operating system routine to obtain the module defined entry points for start, quiesce, load and unload module handlers. At step 1308, part of the registration processing may include storing this information in the module table as well as other processing described herein. Control may be transferred to step 1304 when performing logical load processing. At step 1310, the module load handler may be invoked.

In connection with logical unload processing, control may be transferred via an RPC from the CLI code to 1322 to logically unregister the module such as, for example, remove the module from the module table. The module unload handler may then be invoked. In connection with unload processing, control may be transferred via an RPC from the CLI code to 1320 where the native operating system routine is directly invoked to physically unload a module.

It should be noted that in connection with loading a module which is in U space as represented in FIG. 15, an embodiment in accordance with techniques described herein may perform physical load processing (1302, 1303, 1306 and 1308) followed by the logical load processing (1304 and 1310). In connection with unloading a module which is in U space as represented in FIG. 15, an embodiment in accordance with techniques described herein may perform logical unload processing (1322) followed by physical unload processing (1320).

As illustrated and described in connection with FIG. 15 when the target container into which a module is loaded/unloaded is in user space, there is no callback into the OS dependent stub to defined entry points as in connection with a target container which is in kernel space. In user space, the OS specific skeleton in the Windows-based operating system does not include the two defined entry points as illustrated, for example, in connection with FIG. 8.

As described elsewhere herein in connection with the target kernel space container, code of the container module DB API code may perform other processing than as illustrated in FIG. 15. The code of 1310 may also, for example, perform state transition verification processing, verification for resource accounting in connection with unloading a module, and the like.

In connection with techniques herein, a user may directly utilize an operating system facility or other mechanism to dynamically load a module into a container where the module has been produced using the build procedure herein. In other words, an OS specific module may be created using the techniques herein but may be loaded into a container using interfaces and techniques other than as described herein such as using the CLI_load API and associated processing. As a result, all appropriate portions of the code of the container module DB API of the target container may not be invoked to initialize and create an entry in the module table as may be the case with using the CI_load API code. Building an OS specific module using the techniques herein but dynamically loading the OS specific module without using the techniques and interfaces defined herein may be characterized as an unsolicited load. In this case with an unsolicited load when the module is loaded into a K space container, information may be added to the module table for the module. As described above, execution of the native operating system dynamic load routine results in a transfer of control to the defined entry point (denoted by EP1 in FIG. 8) in the OS dependent stub, the OS independent stub, and then subsequently control is transferred to the target container module DB API code for registration. At this time, if the load is an unsolicited load, there will be no entry in the module table. In contrast in connection with a load performed using the interfaces and techniques herein (such as illustrated in FIG. 10), step 806 processing of FIG. 10 includes processing which would have already been performed to initialize and create an entry in the module table. Thus, an unsolicited load may be detected when control has been transferred to the container module DB API code as a result of executing the native operating system routine to dynamically load the module and there is no corresponding entry for the module found in the module table. In connection with unsolicited loads, an entry may then be made in the table of module information used by the container module DB API code. The entry may indicate a special module state and associated information to indicate an unsolicited load was performed for this module. The module may be loaded, started, or quiesced as described elsewhere herein except that if the user then attempts to unload the module using the defined APIs as described herein (e.g., using the CLI_unload processing described herein), the module DB API code invoked as a result of the CLI_unload processing only performs logical unload processing and does not physically or dynamically unload the module from the target container's address space. It is assumed that since the physical loading of the module into the target container's address space was accomplished through some other mechanism (besides using the CLI_load processing and associated techniques described herein), the user will also, in a similar manner, be responsible for physically unloading the module using some other mechanism. It should be noted that the foregoing for unsolicited loads may be performed in an embodiment in connection with loading a module into kernel space container only, and not a user space container since the foregoing process flow may only occur in connection with loading a module into a kernel space container.

In connection with techniques herein, a programmer may have knowledge of a predefined order in which interdependent modules are to be unloaded or terminated. A programmer may have knowledge, for example, as to the particular order in which modules should be unloaded. Alternatively, an embodiment in accordance with the techniques herein may be used to allow for unloading of modules without requiring such knowledge and without coding in a predetermined order. Such an embodiment may use the quiesce functionality described herein as part of processing performed in connection with preparing to physically unload a series of interdependent modules in one or more containers such as may be performed using operating system native routine calls and functionality. An example of processing that may be performed to unload interdependent modules where the unloading is not in a predetermined order is illustrated in FIG. 16.

Referring to FIG. 16, shown are logical processing steps as may be performed by code of the CLI API for unloading all loaded modules. In this example 1400, processing may be performed to repeatedly try to quiesce and then unload modules in a next iteration if, in a current iteration over all the modules, progress is made. In one embodiment, progress may be made in a current iteration if there has been at least one additional module which has been successfully quiesced or unloaded in the current iteration than in the previous such iteration.

In the example 1400, a list of all modules in all containers may be obtained in step 1402. At step 1404, variables quiesce count and unload count may be initialized. At step 1406, processing is commenced for each module in the list from step 1402. For each module, processing denoted between 1408 and 1427 may be performed for a single processing iteration. At step 1410, CLI_quiesce is invoked for the module. If the quiesce is successful, control proceeds to step 1414 to increase quiesce count. At step 1418, CLI unload module is performed. At step 1420, a determination is made as to whether the module unload was successful. If so, then unload count is increased in step 1422. If the quiesce processing at step 1412 was not successful, step 1426 is performed to track the module as failing for the current iteration. At step 1428, if all the modules have been successfully unloaded as a result of the "try again" processing for the current iteration (e.g., current iteration of performing processing of the for loop from steps 1406 to 1427 for each module), processing stops.

Processing proceeds to step 1430 if not all modules have been unloaded. At step 1430, a determination is made as to whether progress has been made. In this embodiment, it may be determined that progress has been made if either of the variables unload count or quiesce count have increased by at least 1 since the previous iteration of try again processing over all modules. It should be noted that an embodiment may determine progress in other ways than as described above. If step 1430 determines that progress has been made, control proceeds to step 1434 and control proceeds to try again at step 1406 for a next iteration over all the modules. If no progress has been made, control proceeds to the else processing at step 1436. At step 1440, one of the user space containers is selected. The selected user space container may, for example, be characterized as including a failing module such as one impeding further progress with respect to FIG. 16 processing. It should be noted that if such an assessment regarding module or U (user) space container failure cannot be determined, a U space container may be selected randomly or using any other suitable technique. The selected U space container may be terminated. Other containers may then appropriately handler the foregoing termination condition or state of the selected container. At step 1442, control then proceeds with try again to see if progress can be made in a next subsequent iteration over the modules.

It should be noted that the rationale for selecting and terminating a U space container in connection with FIG. 16 processing has a goal of dissolving intermodule and/or intercontainer dependency relationships to subsequently allow further progress to be made towards physically unloading all modules of all containers (e.g., such as by having additional successful completion of quiesce and/or unload processing as may be performed, respectively, by the CLI_quiesce and CLI_unload APIs described herein).

An embodiment using the foregoing quiesce processing as described herein, such as performed by the CLI_quiesce API code, may unload modules in an order which does not require knowledge of the intermodule and intercontainer dependencies. The processing of FIG. 16 may be used in an embodiment as part of an automated way of shutting down a system without requiring predefined steps or without requiring knowledge of module and/or resource dependencies to determine an acceptable ordering in which to unload modules.

Those of ordinary skill in the art will appreciate that use of the techniques herein, such as the quiesce processing, have broader applicability and use than as illustrated with examples herein. For example, the quiesce processing described herein may be more generally used to stop or pause performing services by one or more components.

It should be noted that if there is no operating system mechanism to dynamically load a module, an embodiment may include a copy of all the modules in a container when creating a container. In other words, in a target environment where the operating system does not provide loadable module support, the operating system specific modules generated using the techniques herein may be statically linked into the container and injection or dynamic loading may be simulated using an identical interface as described herein.

As described herein, processing may be performed in an embodiment to ensure that all resources of a module are released prior to allowing a module to be unloaded. In one embodiment, such processing may be performed by code of the per container module DB API code which is executed in connection with CLI_unload processing. This may be performed prior to continuing with any other processing in connection with unload processing.

Figure 17:
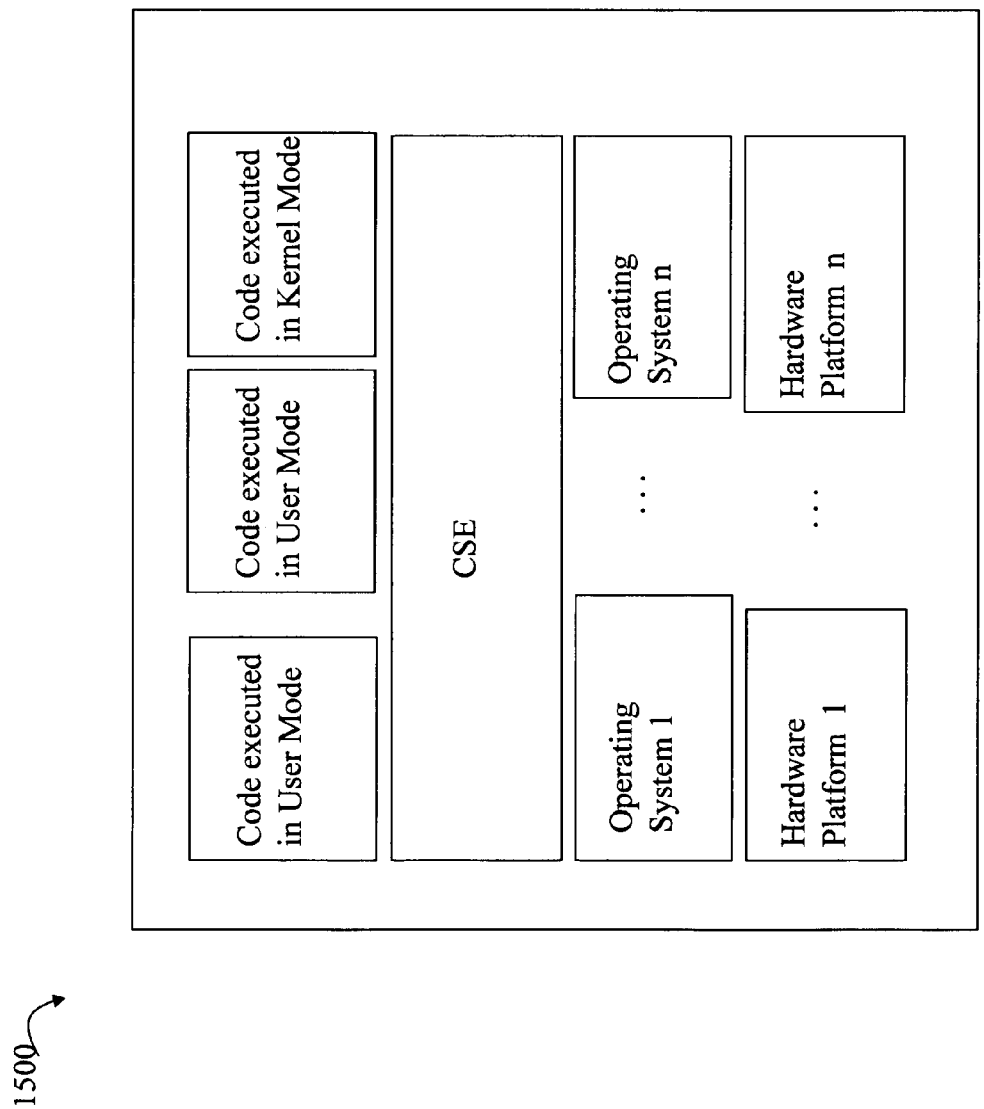
FIG. 17 is an illustration of the different operating systems and hardware platforms that may be included on a data storage system for use with the techniques herein.

Referring to FIG. 17, shown is a representation illustrating the relationship of the common software environment (CSE) components to other components of the data storage system. In the example 1500, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code writing using the API of the CSE may be executed in either user or kernel mode as illustrated herein.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for processing a module comprising:
   generating a module for execution on a target operating system, said module including four entry points and code portions associated with each of said four entry points, said four entry points corresponding to four handlers invoked at different processing points in connection with a runtime state associated with said module, said four handlers including a load handler invoked in connection with dynamically loading said module, an unload handler invoked in connection with dynamically unloading said module, a start handler invoked in connection with starting module-specific processing performed by said module, and a quiesce handler invoked in connection with a request to commence preparation for unloading the module;
   performing first processing in connection with the module, said first processing including at least one of dynamically loading the module, dynamically unloading the module, starting module-specific processing performed by the module, and issuing a request to commence preparation for unloading the module; and
   invoking an appropriate one or more of the four handlers in accordance with the first processing performed, wherein said module is dynamically loaded into an address space of a target container, said target container including code for managing a container module database of modules and associated module information of modules included in the target container, wherein said code for managing a container module database is executed prior to each invocation of any of the four handlers to perform processing at runtime when executing code of the target container to enforce rules of a runtime state model for the module thereby verifying that the module is in an allowable state for a requested transition to another state associated with one of the four handlers subsequently invoked in said each invocation, said runtime state model including valid transitions between runtime states associated with each of said four handlers, said code for managing the container module database acting as a proxy to facilitate invocation of any of the four handlers upon successfully verifying the module is in an allowable state for a requested transition.

2. The method of claim 1, wherein said module is an operating system specific module and the method further comprising:
   dynamically loading said operating system specific module into an address space of a container; and
   invoking said load handler.

3. The method of claim 2, further comprising:
   determining a runtime state associated with the module at a point in time in connection with whether the module at the point in time is loaded, unloaded, quiesced, or started.

4. The method of claim 1, wherein said quiesce handler is invoked in connection with a request to have the module stop providing a service or performing work.

5. The method of claim 1, wherein said module is an operating system specific module and said generating the module further comprises:
analyzing a first code module to generate an operating system specific skeleton in accordance with the target operating system; and
generating the operating system specific module which includes code for the operating system specific skeleton and code for the first code module.

6. The method of claim 5, herein said operating system specific skeleton includes an operating system dependent portion and an operating system independent portion, said operating system dependent portion varying in accordance with whether the target container is a user space container or a kernel space container.

7. The method of claim 6, wherein, in connection with dynamically loading and unloading the operating system specific module into the address space of the target container and the target container is a kernel space container, the target operating system transfers control to the operating system dependent portion, code of the operating system specific dependent portion transfers control to the operating system independent portion, and code of the operating system independent portion transfers control to the code for managing the container module database to register addresses of the four handlers.

8. The method of claim 5, wherein said code for managing a container module database of modules performs processing including maintaining a module table of module information for each module of said target container, said module information including a runtime state of said each module, resource information for said each module, and addresses of handler entry points for said each module, said handler entry points being addresses of the four handlers.

9. The method of claim 8, wherein said code for managing the container module database performs processing to enforce valid state transitions in accordance with said run state model and state information included in the module table.

10. The method of claim 8, wherein said resource information for a module includes an indication as to whether resources are currently allocated and in use by the module.

11. The method of claim 1, wherein processing for dynamically loading the module includes a first portion for physically loading the module into the address space of a target container and a second portion for performing logical load processing, said logical load processing including invoking the load handler.

12. The method of claim 1, wherein processing for dynamically unloading the module includes a first portion for physically unloading the module into the address space of a target container and a second portion for performing logical unload processing, said logical unload processing including invoking the unload handler.

13. The method of claim 1, wherein said module is being dynamically loaded into an address space of a kernel space container, and the method includes transferring control to a helper module executing in user space, said helper module executing an operating system native call to dynamically load the module into the kernel space container.

14. The method of claim 13, wherein the kernel space container includes first code which maintains module information about modules of the kernel space container, the first code being invoked by the operating system as a result of executing said operating system native call to dynamically load the module, the first code updating module information to include addresses of the four handlers.

15. A non-transitory computer readable medium comprising executable code stored thereon for processing a module, the non-transitory computer readable medium comprising executable code stored thereon for:
generating a module for execution on a target operating system, said module including four entry points and code portions associated with each of said four entry points, said four entry points corresponding to four handlers invoked at different processing points in connection with a runtime state associated with said module, said four handlers including a load handler invoked in connection with dynamically loading said module, an unload handler invoked in connection with dynamically unloading said module, a start handler invoked in connection with starting module-specific processing performed by said module, and a quiesce handler invoked in connection with a request to commence preparation for unloading the module;
performing first processing in connection with the module, said first processing including at least one of dynamically loading the module, dynamically unloading the module, starting module-specific processing performed by the module, and issuing a request to commence preparation for unloading the module; and
invoking an appropriate one or more of the four handlers in accordance with the first processing performed, wherein said module is dynamically loaded into an address space of a target container, said target container including code for managing a container module database of modules and associated module information of modules included in the target container, wherein said code for managing a container module database is executed prior to each invocation of any of the four handlers to perform processing at runtime when executing code of the target container to enforce rules of a runtime state model for the module thereby verifying that the module is in an allowable state for a requested transition to another state associated with one of the four handlers subsequently invoked in said each invocation, said runtime state model including valid transitions between runtime states associated with each of said four handlers, said code for managing the container module database acting as a proxy to facilitate invocation of any of the four handlers upon successfully verifying the module is in an allowable state for a requested transition.

16. The non-transitory computer readable medium of claim 15, wherein said module is an operating system specific module and the non-transitory computer readable medium further comprising executable code for:
dynamically loading said operating system specific module into an address space of a container; and
invoking said load handler.

17. The non-transitory computer readable medium of claim 16, further comprising executable code for:
determining a runtime state associated with the module at a point in time in connection with whether the module at the point in tune is loaded, unloaded, quiesced, or started.

18. The non-transitory computer readable medium of claim 15, wherein said quiesce handler is invoked in connection with a request to have the module stop providing a service or performing work.

19. The non-transitory computer readable medium of claim 15, wherein said module is an operating system specific module and said executable code for generating the module further comprises executable code for:
- analyzing a first code module to generate an operating system specific skeleton in accordance with the target operating system; and
- generating the operating system specific module which includes code for the operating system specific skeleton and code for the first code module, wherein said operating system specific module is dynamically loaded into an address space of a target container, said target container including code for managing a container module database of modules and associated module information of modules included in the target container, wherein said module is a binary and the first code module is a source code module.

* * * * *